(12) United States Patent
Caldwell-Edmonds et al.

(10) Patent No.: US 9,640,087 B2
(45) Date of Patent: May 2, 2017

(54) APPARATUS AND METHOD FOR TEACHING HOW TO PLAY NOTES ON THE KEYS OF A PIANO

(71) Applicants: Carol Susan Caldwell-Edmonds, Belvidere, VT (US); Shannon Jean Caldwell Edmonds, Belvidere, VT (US)

(72) Inventors: Carol Susan Caldwell-Edmonds, Belvidere, VT (US); Shannon Jean Caldwell Edmonds, Belvidere, VT (US)

( * ) Notice: Subject to any disclaimer, the term of this patent is extended or adjusted under 35 U.S.C. 154(b) by 0 days.

(21) Appl. No.: 14/986,663

(22) Filed: Jan. 2, 2016

(65) Prior Publication Data
US 2016/0217702 A1    Jul. 28, 2016

Related U.S. Application Data

(60) Provisional application No. 62/106,348, filed on Jan. 22, 2015.

(51) Int. Cl.
*G09B 15/02*   (2006.01)
*G10G 1/02*   (2006.01)

(52) U.S. Cl.
CPC .............. *G09B 15/026* (2013.01); *G10G 1/02* (2013.01)

(58) Field of Classification Search
CPC ........ G09B 15/00; G09B 15/02; G09B 15/08; G09B 5/06; G09B 19/00; G09B 5/02; G10G 1/02; G10G 7/00

USPC .................................................. 84/470 R, 472
See application file for complete search history.

(56) References Cited

U.S. PATENT DOCUMENTS

| | | | |
|---|---|---|---|
| 4,464,971 A * | 8/1984 | Dean .................... | G09B 15/026 84/471 R |
| 5,254,008 A | 10/1993 | Dawson | |
| 6,057,501 A | 5/2000 | Hale | |
| 6,881,887 B2 | 4/2005 | Berens | |
| 7,439,438 B2 | 10/2008 | Hao | |
| 8,188,356 B2 | 5/2012 | Rose | |
| 8,558,098 B1 | 10/2013 | Mauldin | |
| 8,664,502 B2 | 3/2014 | Kellner | |

* cited by examiner

*Primary Examiner* — Kimberly Lockett
(74) *Attorney, Agent, or Firm* — Thomas G. Ference

(57) ABSTRACT

An apparatus, teaching method and composing method are disclosed as part of a kit to teach playing the piano. The kit incorporates special arrangements of music notation symbols on cling sheets. The cling sheets cling to a piano keyboard and to a music stand that has a presentation surface. The size of the spaces between the five staff lines on the cling sheets are such that musical notes on the staff lines accurately define finger placement on standard piano keys. The static cling sheets with music notation symbols are used as manipulatives and not just labels or identifiers as has been used in the past. The apparatus and methods do not require that students memorize letters, symbols and the music staff before they can play music; rather it allows students to manipulate symbols printed on cling sheets to learn how to play piano.

16 Claims, 15 Drawing Sheets

© 2014 Carol Caldwell-Edmonds and Shannon Edmonds

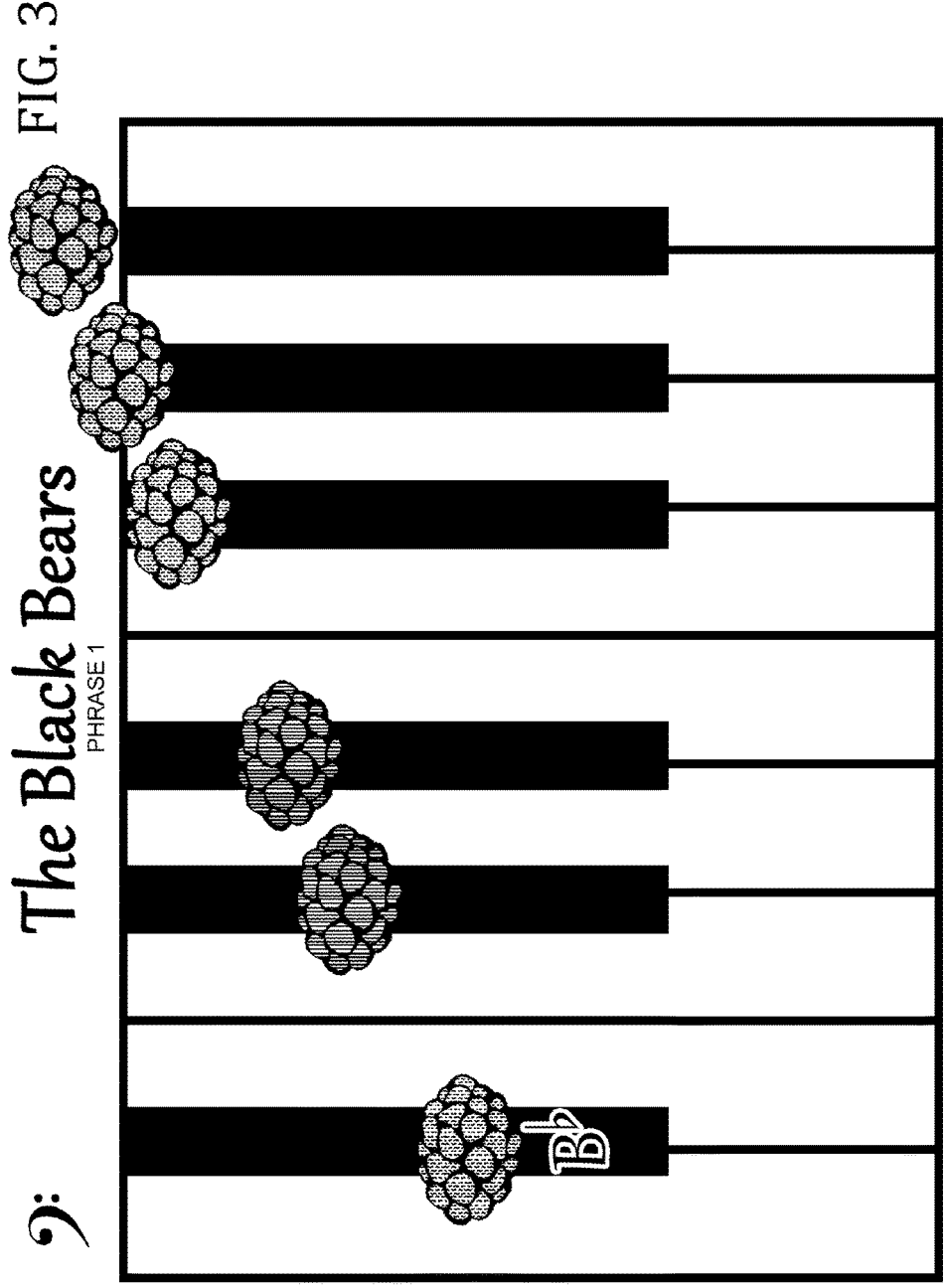
© 2014 Carol Caldwell-Edmonds and Shannon Edmonds

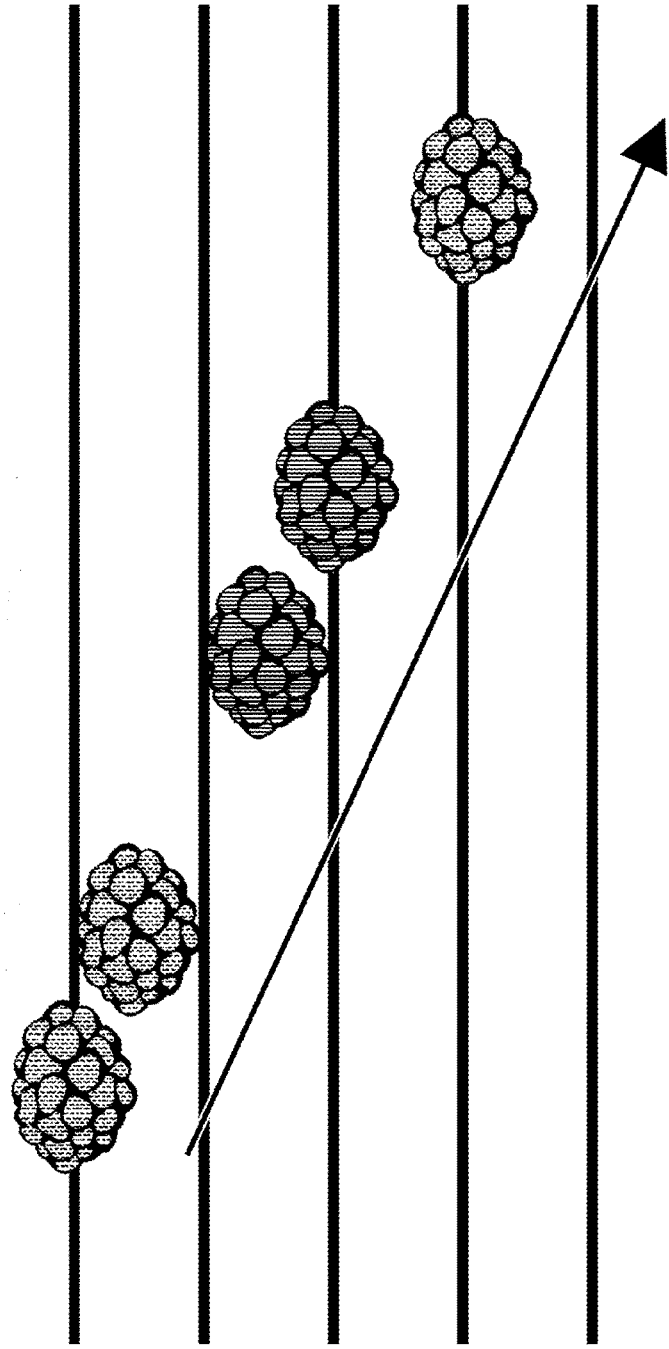

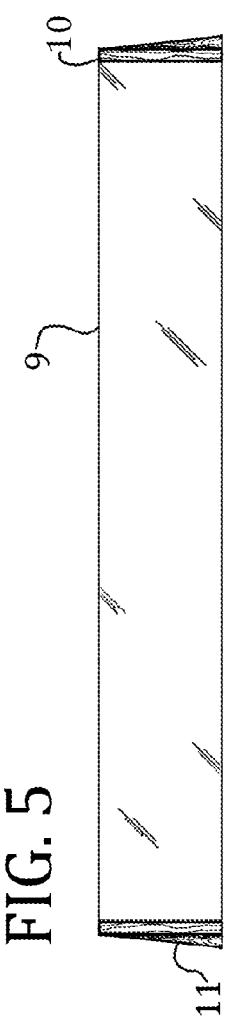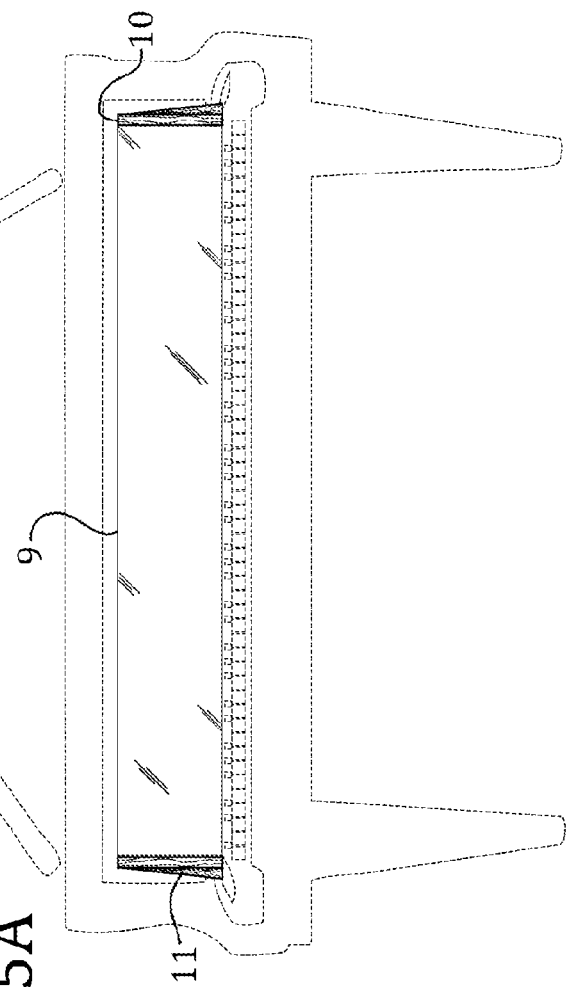

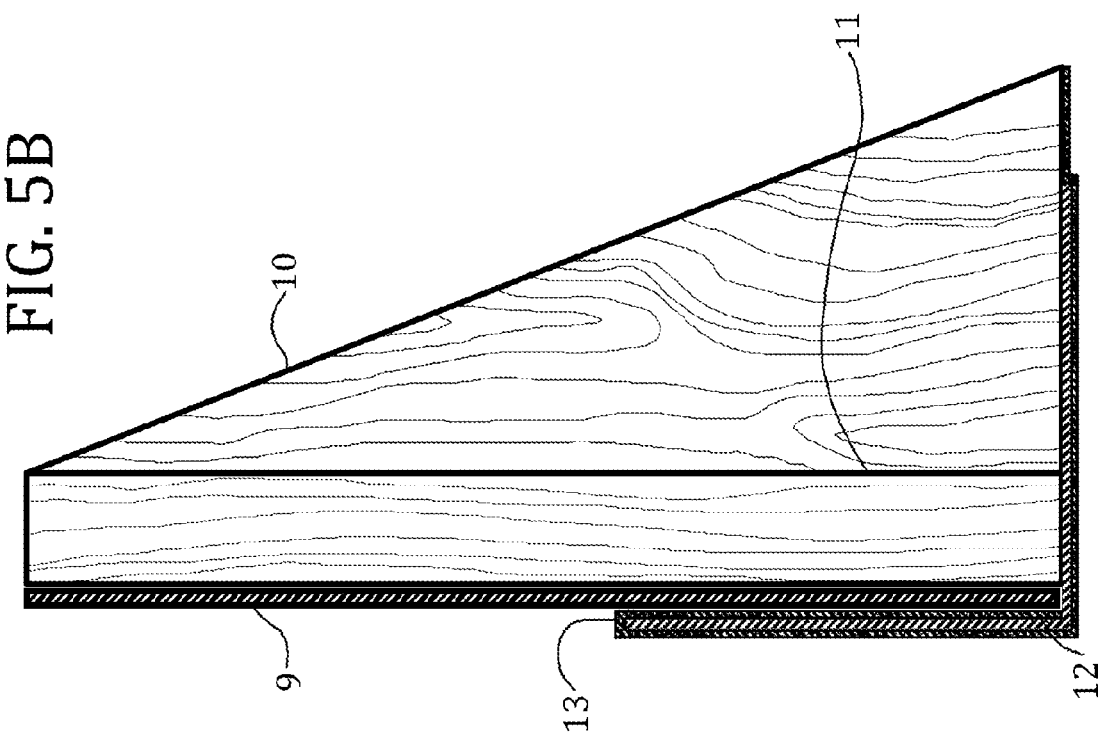

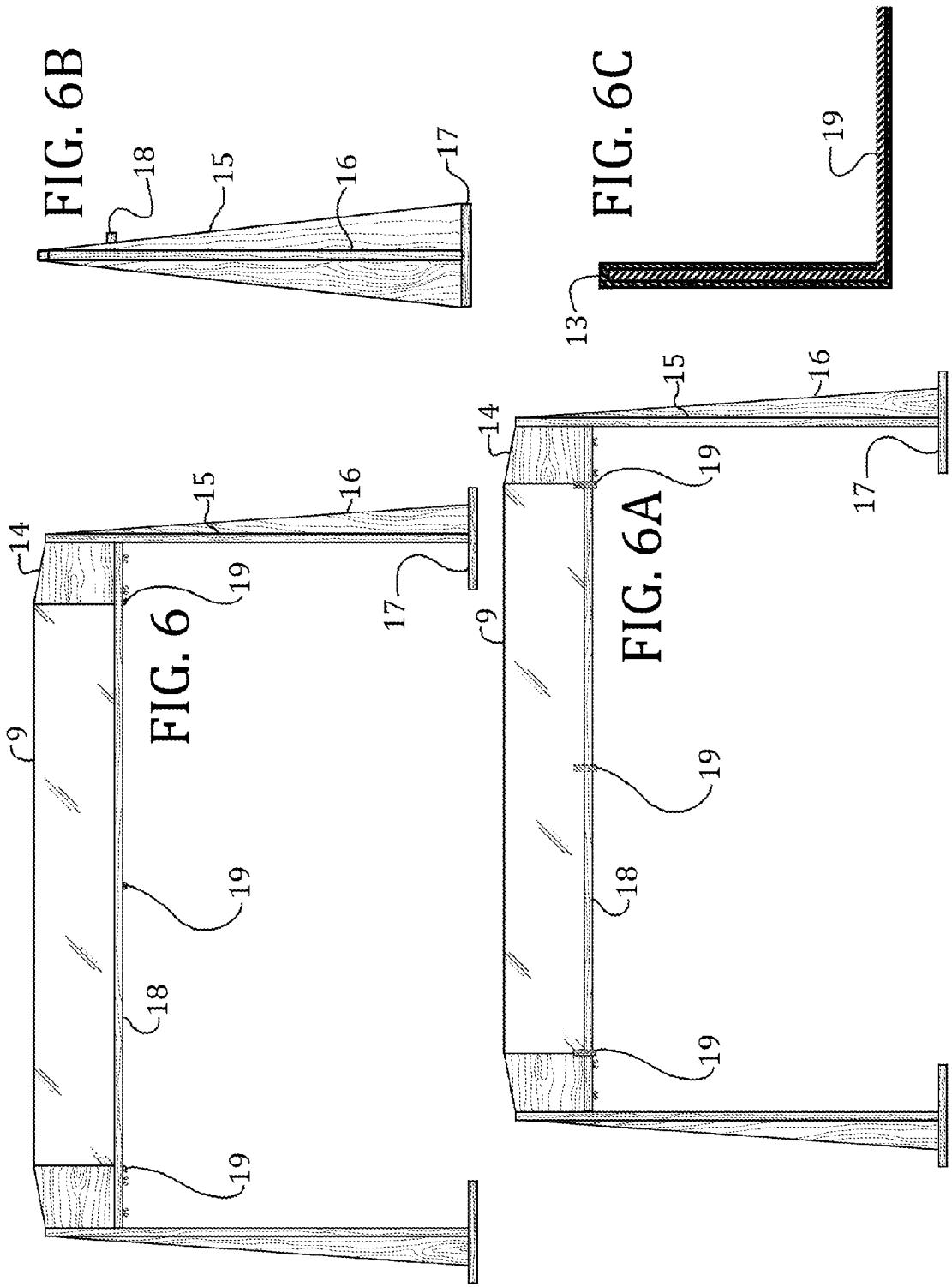

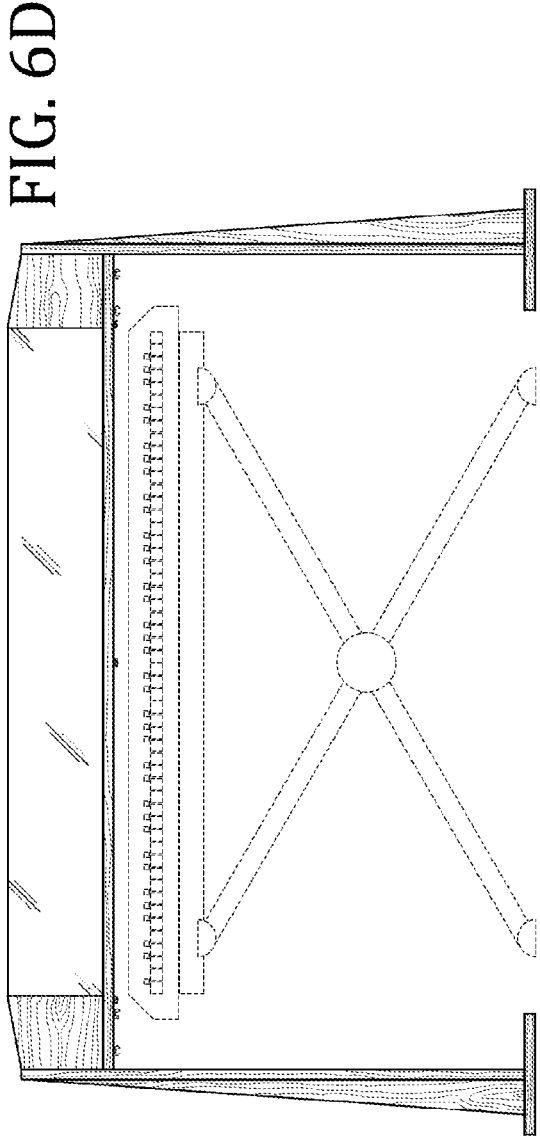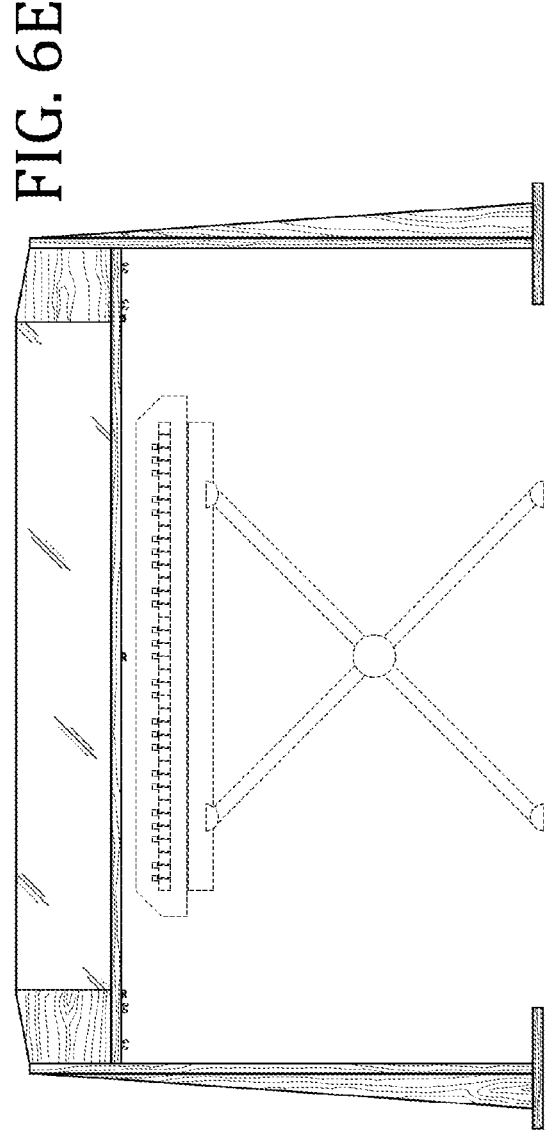

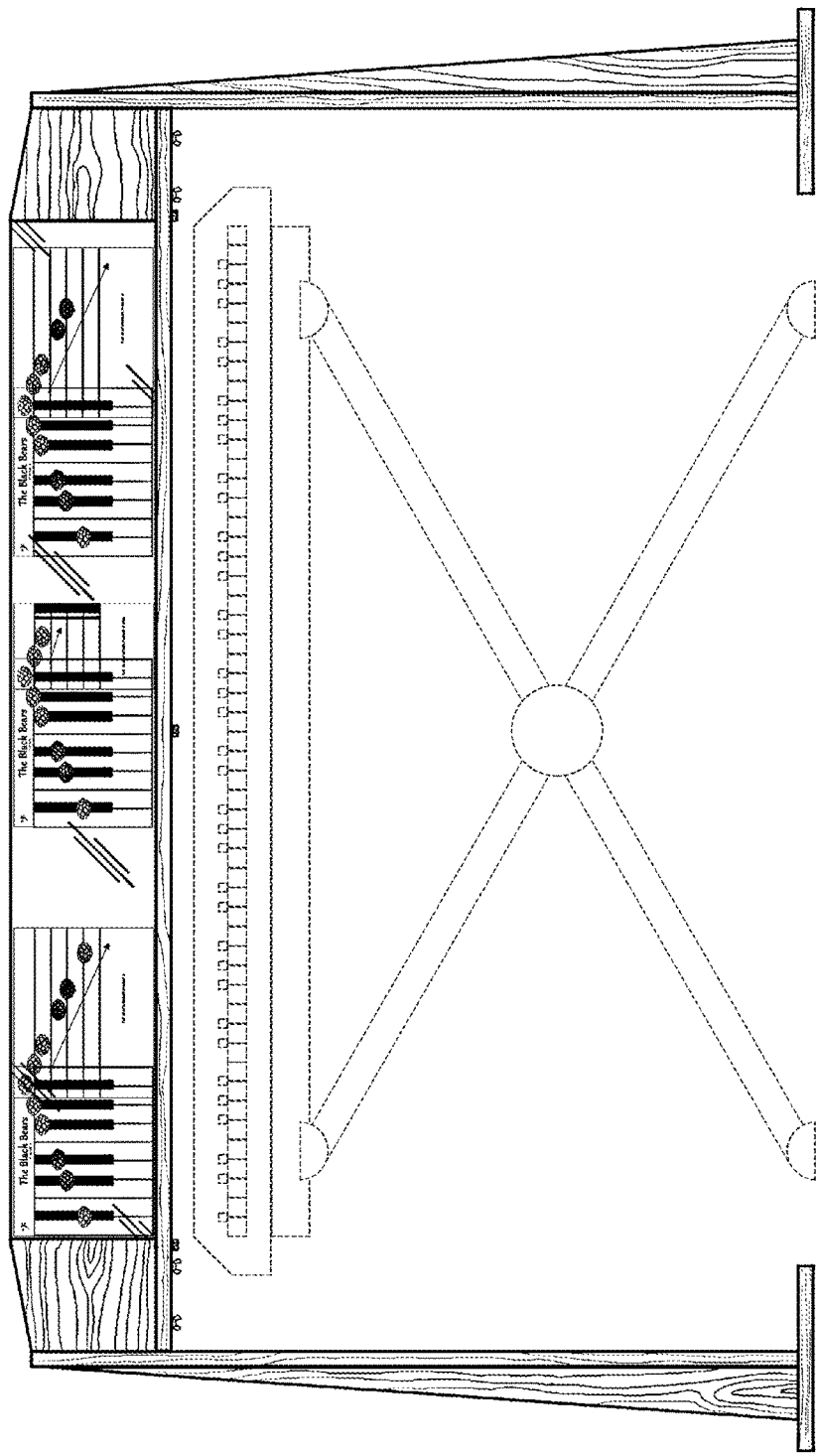
© 2014 Carol Caldwell-Edmonds and Shannon Edmonds

© 2014 Carol Caldwell-Edmonds and Shannon Edmonds

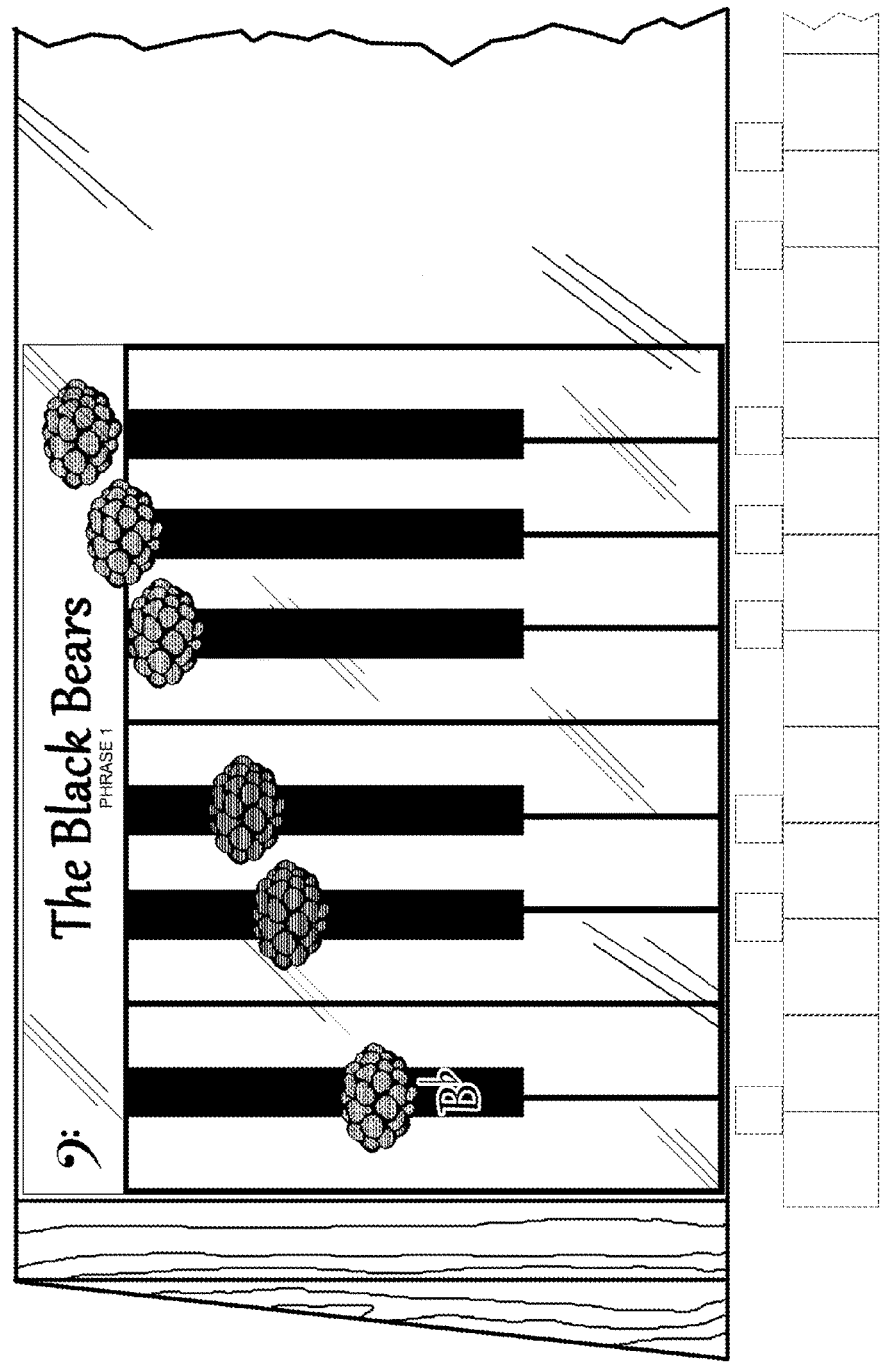

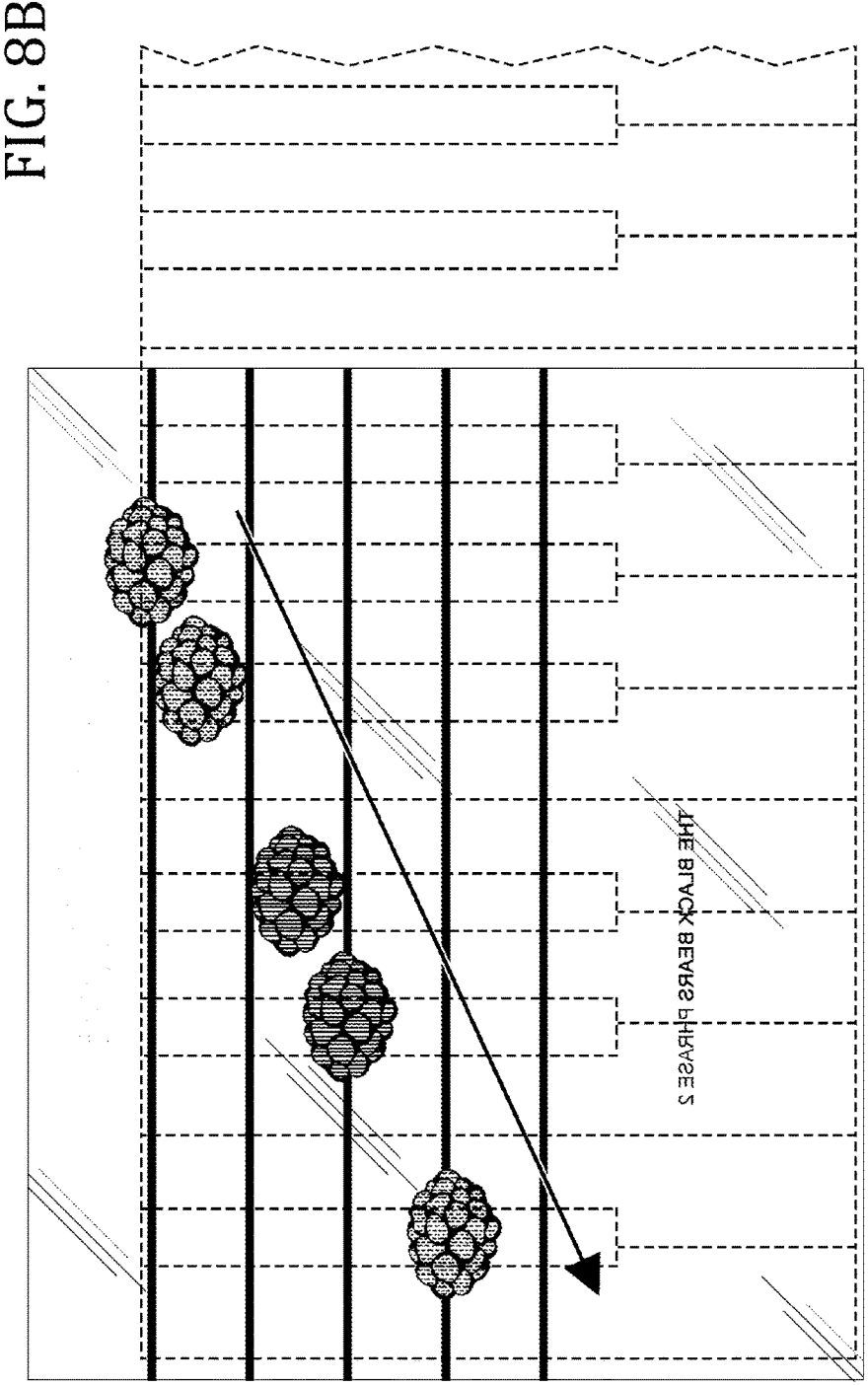
© 2014 Carol Caldwell-Edmonds and Shannon Edmonds

© 2014 Carol Caldwell-Edmonds and Shannon Edmonds

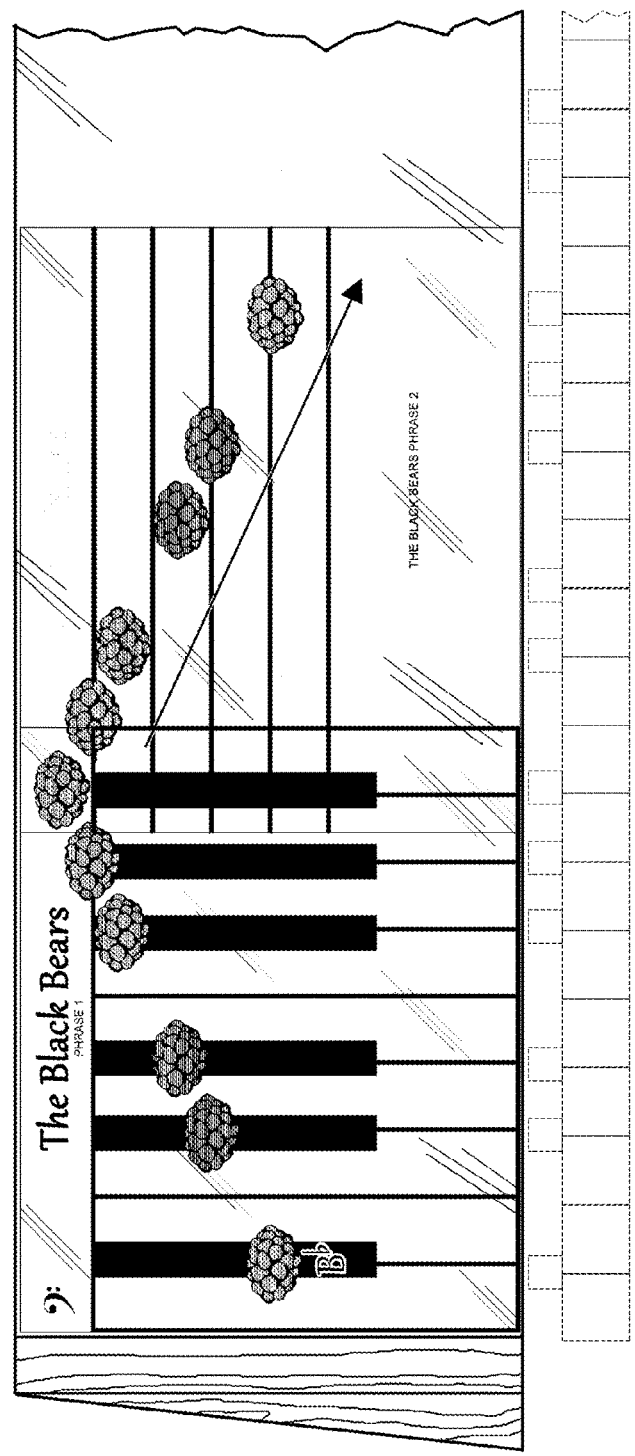
© 2014 Carol Caldwell-Edmonds and Shannon Edmonds

APPARATUS AND METHOD FOR TEACHING HOW TO PLAY NOTES ON THE KEYS OF A PIANO

RELATED APPLICATIONS

This application claims the benefit of priority of U.S. Provisional Application No. 62/106,348, filed Jan. 22, 2015 entitled: "Apparatus and method for composing piano pieces and teaching piano music notation and teaching piano playing", the entire contents of which is incorporated herein by reference. This application is related to U.S. Design application Ser. No. 29/515,377, filed concurrently on Jan. 22, 2015 entitled: "Music Rest and Stand".

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The present invention relates to an apparatus and a method for composing music, teaching music notation, and teaching playing the piano. More specifically it relates to a kit that includes cling sheets with indicia, the cling sheets are used for teaching how to play notes on the keys of a piano.

BACKGROUND

Current piano teaching pieces, books of piano pieces for beginners, and piano lesson series are in actuality music reading lessons that use a piano. Beginners' piano lesson books introduce the groups of two black keys alternating with groups of three black keys to explain the layout of a piano keyboard, but that is the only lesson that utilizes the entire range of piano keys. After that one introduction, almost all beginners' piano lesson books keep a student's hands on the keyboard positioned around "middle C," and the white keys (a.k.a. natural keys) immediately above middle C and below Middle C—for the length of the entire beginner series of songs. Such an approach, by focusing on middle C and the white keys above and below middle C, requires students to memorize letters, symbols, and the music staff at the expense of exploring the large, rich sounds that only a piano can make. Only students who have reading skills, or who can develop a quick recognition of symbols on paper succeed with this method. Creativity is discouraged in favor of mastering basic, traditional music notation.

Such an approach, by focusing on middle C and the white keys above and below middle C, prevents the exploration of the physical techniques of piano playing by avoiding the black keys, which fit under the hands naturally. When black keys on the piano are played as the present invention teaches, players learn correct hand positions and develop habits that build strength, independence, and dexterity of the hands required for playing the piano.

Further, such an approach, by focusing on middle C and the white keys above and below middle C, creates unnecessary limitations for beginning piano students who play by ear, by touch, and by looking at the keys. Further, beginning piano students may form incorrect conclusions, including: piano music that requires one to play on black keys is more difficult than piano music that only requires one to play on white keys; there is a sequential approach to learning how to play the piano that must begin in the key of C major; you can only play on black keys after you learn what accidentals are in music notation. All of the conclusions listed in the preceding statement are false.

Related patents known in the background art include the following: U.S. Pat. No. 8,188,356, issued to Rose on May 29, 2012, discloses a system to teach music notation and composition using static cling tiles, or magnetic tiles to teach pitch and rhythm of standard music notation. U.S. Pat. No. 8,664,502, issued to Kellner on Mar. 4, 2014, discloses a method of locating, discovering, and memorizing the names of the notes for acoustic and electric stringed musical instruments, which may comprise a static cling embodiment. U.S. Pat. No. 8,558,098, issued to Mauldin on Oct. 15, 2013, discloses reconfigurable magnetic numerical keyboard charts and numerically notated sheets for teaching students to play piano, which may comprise a static cling embodiment. Prior art uses transparent overlays to teach scales and key signatures, or to aid students in reading traditional music notation by associating piano keys with numbers in sheet music that are based on numbered indicators, which differs from the use of static cling vinyl educational manipulatives in this current invention.

The foregoing patent information reflects the state of the art of which the inventor is aware and is tendered with a view toward discharging the inventor's acknowledged duty of candor in disclosing information that may be pertinent to the patentability of the technology described herein. It is respectfully stipulated, however, that the foregoing patent and other information do not teach or render obvious, singly or when considered in combination, the inventor's claimed invention.

SUMMARY

The present invention seeks to provide solutions to the problems described in the preceding Background section by providing an apparatus and a teaching method, and a composing method; the teaching method is based on music written using the composing method that provides Music Cling™ sheets printed with Berry Musical© 2014 Carol Caldwell-Edmonds and Shannon Edmonds music notation symbols. The Music Cling™ sheets as described below and illustrated in the figures, cling to a piano keyboard, and to an apparatus described below in this present invention. The teaching method that is an object of this present invention, described in detail below, provides instruction to relate the aforementioned Berry Musical© 2014 Carol Caldwell-Edmonds and Shannon Edmonds music notation symbols to the physical keys on a piano, and to relate the aforementioned Berry Musical© 2014 Carol Caldwell-Edmonds and Shannon Edmonds music notation symbols to a 5-line music staff.

Hereinafter, the term "Berry Musical notes" refers to Berry Musical© 2014 Carol Caldwell-Edmonds and Shannon Edmonds music notation symbols, and include notes, rests, and any illustration used to denote a musical symbol as printed in the Studio in the Woods Piano Series© 2014, Carol Caldwell-Edmonds and Shannon Edmonds.

Hereinafter, the term "Music Cling sheets" refers to Music Cling™ sheets comprising printable, transparent static-cling vinyl sheets, with Berry Musical notes printed on them, as described below.

Hereinafter, the term "Studio in the Woods Piano Series" refers to Studio in the Woods Piano Series© 2014, Carol Caldwell-Edmonds and Shannon Edmonds.

It is one object of the present invention to provide Berry Musical notes.

It is another object of the present invention to provide Music Cling sheets.

It is another object of the present invention to provide a specifically sized five line music staff such that when the staff is printed on a Music Cling sheet, it allows the placement of Berry Musical notes in positions on the aforementioned specifically sized five lined staff printed on a Music Cling sheet such that when the Music Cling sheet is overlaid, as described and illustrated below, onto a second Music Cling sheet comprising Berry Musical notes printed on an outline of piano keys, as described and illustrated below, the positions of the Berry Musical notes printed both aforementioned Music Cling sheets will match. A Berry Musical note occupies the same position on both the keyboard and staff, only when a Music Cling sheet printed with Berry Musical notes and staff lines is flipped from the front side to the back side and the staff lines are positioned over and aligned perpendicular to the length of the natural keys of a piano key or on top of a Music Cling sheet printed with piano key outlines and the same Berry Musical notes, as described in further detail with regard to the description and figures given below.

It is another object of the present invention to provide an embodiment of an apparatus, which can be placed upon the key blocks of an acoustic piano, to which the aforementioned Music Cling sheets adhere, are removed, are replaced, and adhere again as needed according to the teaching method that is an object of this present invention.

It is another object of the present invention to provide an embodiment of an apparatus, which can be placed on the floor, to which the aforementioned Music Cling sheets adhere, are removed, are replaced, and adhere again as needed according to the teaching method that is an object of this present invention.

It is still another object of the present invention to provide a method for composing piano pieces that satisfy the requirements specified in this present invention for positioning Berry Musical notes on Music Cling sheets.

It is still another object of the present invention to provide a method for teaching music notation and piano playing, including but not limited to the use of superimposing the Music Cling sheets to illustrate how note symbols as described in this present invention indicate which key to play on a piano keyboard, and which position of a note symbol on a music staff matches that same key.

These and other objects of the present invention will be explained in further detail with regard to the description and figures given below.

BRIEF DESCRIPTION OF THE INVENTION

The present invention is of an apparatus and a teaching method, and a composing method, said teaching method based on music written using the composing method that provides Music Cling sheets printed with Berry Musical music notation symbols. Piano pieces, for students who are beginning piano lessons, which comprise the Studio in the Woods Piano Series, use Berry Musical notes as a music notation for teaching students how to read music and how to play the piano. Berry Musical notes are printed as described below, on Music Cling sheets. Music Cling sheets cling to actual piano keys, as well as to an apparatus that is described in the detailed description of the invention below.

Two preferred embodiments of the apparatus, described below and shown in the figures of this present invention, are provided so that the apparatus can be used by being placed upon acoustic pianos, or by being placed over electronic pianos: the first embodiment is placed on the key blocks at either end of an acoustic piano keyboard; a second embodiment stands on the floor and positions the apparatus above an electronic piano keyboard. The length of the apparatus described in the detailed description of the invention below is based upon a standard eighty-eight key piano keyboard. An eighty-eight key length is required because the piano teaching method described below teaches how to play a piano using all registers on a piano.

The apparatus includes a white 20% translucent acrylic panel to which static cling transparent printable vinyl sheets cling. The aforementioned first embodiment, for acoustic pianos, provides an acrylic panel placed just in front of the fall board of an acoustic piano model with two side supports which rest upon each key block, one at each end of a piano keyboard, holding the acrylic panel up perpendicular to the piano keys. The aforementioned second embodiment provides the aforementioned acrylic panel supported by two supports, the supports stand on the floor and are positioned such that the acrylic panel extends over the keys of an electronic piano, perpendicular to the keys.

A Music Cling sheet comprises a sheet of printable transparent static cling vinyl, cut to specific sizes, the height of each sheet being 7-inches, the height determined by the apparatus that is one object of this invention, and the length of a Music Cling sheet being determined by the length of a musical phrase printed thereon. Berry Musical notes comprise note heads printed as illustrations of wild black raspberries, and other illustrations, described below. The Berry Musical notes are printed on a Music Cling sheet. Collections of the Music Cling sheets comprise two sets of teaching pieces that are included in the Studio in the Woods Piano Series.

Some Music Cling sheets are printed with outlines of piano keys, with Berry Musical notes printed on the keys that should be played; other Music Cling sheets are printed with a five line music staff to become a staff cling sheet, and Berry Musical notes heads aligned with the staff lines indicating keys to be played, as described in the detailed description of the present invention below. Staff lines have a space between any two staff lines that is substantially equal to the width of one natural key as shown in FIG. 8B.

The teaching method that is an object of this present invention, provides principles and execution of a method for teaching music notation and piano playing according to the present invention, using Music Cling sheets to help students make connections between physical finger touches on piano keys and abstract symbols for notes, the symbols include the use of colors, as shown in the figures below. Berry Musical notes printed in the colors indicate which hand a student should use to play. Other illustrations, examples of which are shown in the figures below, indicate rhythmic duration.

The first set of piano pieces in the Studio in the Woods Piano Series comprises only Music Cling sheets printed with piano key outlines and Berry Musical notes in ascending melodic phrases. Music Cling sheets printed with piano key outlines include Berry Musical notes that are played from left to right, which is considered "UP" the keyboard, from notes of lower pitch to notes of higher pitch. Each piece is a brief ascending melody. The piano key outlines are sized, as described in detail below, to match actual piano key sizes when overlaid on actual piano keys. Since Music Cling sheets can be removed from the apparatus and placed over the same keys in another piano register, students play in all registers, not just in the center register surrounding middle C, from the beginning of the teaching method.

The second set of piano pieces in the Studio in the Woods Piano Series comprises pairs of Music Cling sheets: the first Music Cling sheet in a pair is printed with piano key outlines and Berry Musical notes that are played from left to right, similar to aforementioned pieces in the first set; a second Music Cling sheet in a pair is printed with a staff, as described below in the detailed description, and Berry Musical notes that are played from right to left, which is considered DOWN the keyboard, from notes of higher pitch to notes of lower pitch. Each pair thus includes an ascending and a descending melodic phrase, in that order.

The Berry Musical notes printed on a Music Cling sheet that is printed with a five line staff (staff cling sheet), as described below, will align with actual piano keys or piano key outlines printed on another Music Cling sheet, when the following actions are taken by a student or teacher: the aforementioned Music Cling sheet printed with a staff and Berry Musical notes is flipped from the front side to the back side and the staff lines are positioned over and aligned perpendicular to the length of the natural keys of a piano keyboard, or the aforementioned Music Cling sheet is flipped from the front side to the back side and the staff lines are positioned over and placed over a Music Cling sheet that includes the outlines of piano keys printed on it, the apparatus positioned perpendicular to the keyboard, as described below and shown in the figures below.

More advanced pieces in the second set of piano pieces in the Studio in the Woods piano Series use traditional music notation symbols so that the pieces are longer and consist of more than one pair of Music Cling sheets. Some pieces include Music Cling sheets that, when placed along the apparatus over the keyboard, will show that all of the registers depicted come together to make up the 88-key keyboard layout of a standard piano, as described below and shown in FIG. 7.

The aforementioned method of teaching music notation and piano playing which requires the use of Music Cling sheets and Berry Musical notes will be described below in order of the stages that comprise the teaching method, the teaching method is one object of this present invention. The description of the stages will also include examples from The Studio in the Woods Piano Series. The pieces are composed according to the method of composing piano music that is an object of this present invention. Examples of teaching pieces in the descriptions of each stage of the teaching method below are from the Studio in the Woods Piano Series, it being understood that these examples are given for illustrative purposes only and are not meant to be limiting.

BRIEF DESCRIPTION OF THE DRAWINGS

The forgoing and other aspects and advantages of the invention will be apparent from the following detailed description of the invention, as illustrated in the accompanying drawings, in which:

FIG. 3 is an image file that provides a Music Cling sheet that comprises phrase one of "The Black Bears" © 2014 Carol Caldwell-Edmonds and Shannon Edmonds from the second set of teaching pieces in The Studio in the Woods Piano Series, and provides an example of a Music Cling sheet.

FIG. 4 is an image file that provides a Music Cling sheet that comprises phrase two of "The Black Bears" © 2014 Carol Caldwell-Edmonds and Shannon Edmonds from the second set of teaching pieces in The Studio in the Woods Piano Series, and provides an example of a Music Cling sheet.

FIG. 5 is a front elevational view, of a preferred embodiment of an apparatus, which can be placed upon the key blocks of an acoustic piano.

FIG. 5A is a front elevational view of an embodiment of the apparatus shown in FIG. 5, showing how the apparatus is situated on an acoustic piano's key blocks.

FIG. 5B is a cross sectional view of one end piece of the apparatus shown in FIG. 5, viewed from a position to the left side of the apparatus.

FIG. 6 is a front elevational view of an example of a preferred embodiment of an apparatus, which can be placed upon the floor such that it will extend over the keyboard of an electronic keyboard or electronic console piano.

FIG. 6A is a rear elevational view of the apparatus shown in FIG. 6.

FIG. 6B is a left side elevational view of the apparatus shown in FIG. 6.

FIG. 6C is a cross sectional view of a 2-inch by ⅝ inch zinc plated steel corner brace 19, covered by non-slip soft fabric, 13, for example, vinyl fabric of 1/16 inch thickness.

FIG. 6D is a front elevational view of the apparatus shown in FIG. 6 placed in position over an 88-key electronic keyboard.

FIG. 6E is a front elevational view of the apparatus shown in FIG. 6 placed in position over a 61-key electronic keyboard.

FIG. 7 is a front elevational view of the apparatus shown in FIG. 6, showing the correct placement of Music Cling sheets in different registers to allow for more complex pieces consisting of several pairs of phrases, for example, the layout of "The Black Bears" © 2014 Carol Caldwell-Edmonds and Shannon Edmonds from the second set of the Studio in the Woods Piano Series.

FIG. 8, and FIGS. 8a through 8d comprise a series of drawings which illustrate how Music Cling sheets in the second set of the Studio in the Woods piano series are used to teach the concept of the five line music staff.

DETAILED DESCRIPTION OF THE INVENTION

The present invention is of an apparatus and a teaching method, and a composing method, the teaching method based on music written using the composing method that provides Music Cling sheets printed with Berry Musical music notation symbols. The principles and execution of a method for teaching music notation and piano playing according to the present invention may be better understood with reference to the drawings and the accompanying description, it being understood that these drawings are given for illustrative purposes only and are not meant to be limiting. It is further understood that dimensions for objects provided in this present invention, once stated, apply to all mentions of the object hereinafter. The pieces of standard hardware, such as wood screws, corner braces, wing nuts, and hanger bolts, and the fabric that covers the hardware are not themselves objects of this present invention; however, the specific configurations of both embodiments of an apparatus, which is an object of this present invention, require the aforementioned standard hardware and the configurations are an object of this present invention.

Figure 1:
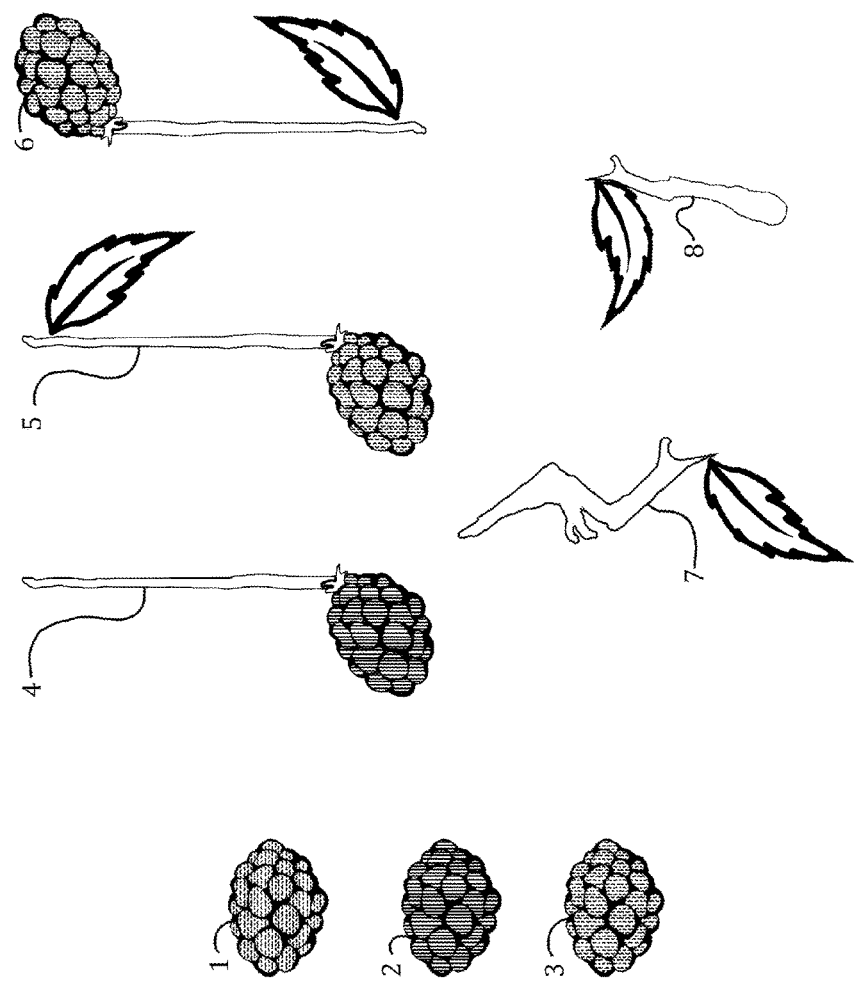
FIG. 1 comprises a set of Berry Musical note types and rest types illustrative of the music notation symbols used in the Studio in the Woods Piano Series.

Referring now to the drawings, FIG. 1, comprises a set of Berry Musical note examples, illustrative of the music notation symbols used in the Studio in the Woods Piano Series, it being understood that these drawings are not meant to be limiting, and that combinations of note heads and stems and leaves, described in detail below, may be provided as needed to meet the musical requirements of a method for composing that is an object of this present invention, further described below. It is further understood that illustrations shown in FIG. 1 are examples of Berry Musical notation symbols, and that illustrations comprising other Berry Musical notation symbols for rests, ledger lines, clusters, etc., under copyright protection in the Studio in the Woods Piano Series, are understood to comprise Berry Musical notation symbols. It is further understood that illustrations shown in FIG. 1 are combined with traditional standard music notation symbols, for example, dots, repeat bar lines, half notes, rests, etc. as needed to correctly represent musical phrases in more advanced teaching pieces in the Studio in the Woods Piano Series. Combining Berry Musical notes with standard notation comprises a stage of the teaching method further described below.

Berry Musical notes notation symbols are similar in shape to traditional standard music notation, but comprise illustrations of elements of the natural environment in which the Studio in the Woods is located, as described in the songs, lyrics, and stories of the characters in the aforementioned Studio in the Woods Piano Series. Berry Musical notes' note heads comprise illustrations of wild black raspberries, the note head is ¾-inch tall, 1-inch wide in printed form. The note heads comprise depictions of the black raspberries' drupelets in combinations of black, red, and lavender, as shown in FIG. 1.

1 comprises a note head illustration example comprising black drupelets, indicating that a piano key indicated by 1 may be played with either the right hand or left hand. 2 comprises a note head illustration example comprising red drupelets, indicating that a piano key indicated by 2 must be played with the right hand. 3 comprises a note head illustration example comprising lavender drupelets, indicating that a piano key indicated by 3 must be played with the left hand.

4 comprises a note illustration example comprising note head 2 and a note stem, the stem comprises a twig illustration, 2½-inches tall, ⁵⁄₃₂-inch wide, indicating that a piano key indicated by 4, for example, must be played by the right hand for a quarter note's duration. 5 comprises a note illustration example comprising note head 3 and a note stem, the stem comprises a twig illustration, and a note flag, the flag comprises a leaf illustration 1¼ inches wide, ¾ inch tall, indicating that a piano key indicated by 5, for example, must be played by the left hand for an eighth note's duration. Note 5, with the stem to the right, flag at the top, is an illustration provided for Berry Musical notes placed on the bottom three lines, and bottom two spaces of a staff, the staff described in detail below, the aforementioned note placements arranged according to the conventions of traditional music notation placement for stems and flags. 6 comprises a note illustration example comprising note head 3 and a note stem, the stem comprises a twig illustration, and a note flag, the flag comprises a leaf illustration, indicating that a piano key indicated by 6, for example, must be played by the left hand for an eighth note's duration. Note 6 with the stem to the left, flag at the bottom, is an illustration used for Berry Musical notes placed on the top three lines, and top two spaces of a staff, the staff described in detail below, the aforementioned note placements arranged according to the conventions of traditional music notation placement for stems and flags.

7 comprises a quarter rest symbol example, comprising an illustration comprising a twig illustration, the twig illustration in a specific modified "Z" shape, and a leaf, the entire illustration is 2½ inches tall, indicating a rest occurs for a quarter note's duration.

8 comprises an eighth rest symbol example, comprising an illustration comprising a twig illustration, the twig illustration in a specific oblique line position, and a leaf at top, extending left, the entire illustration is 2-inches tall, indicating a rest occurs for an eighth note's duration.

Figure 2:
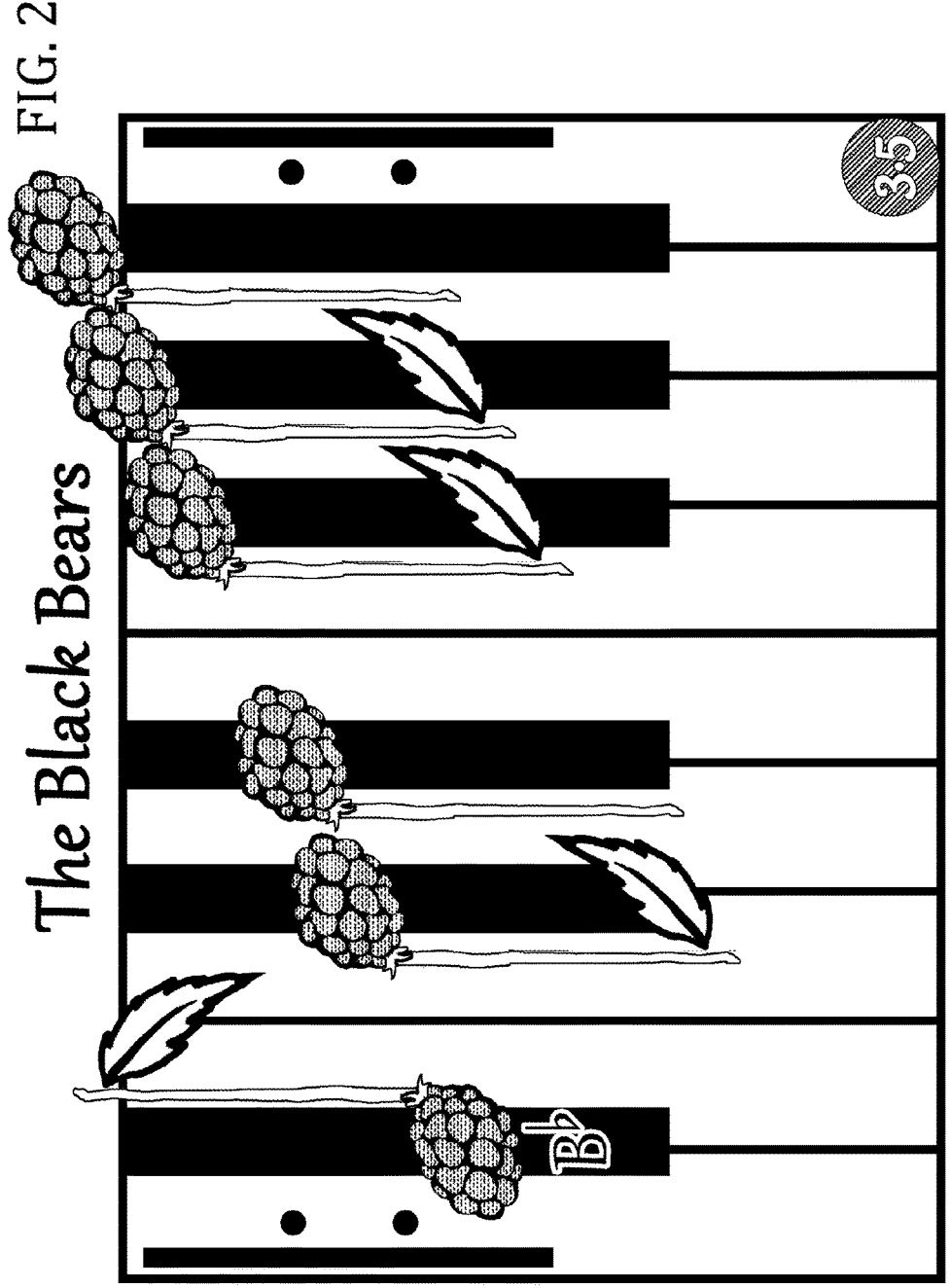
FIG. 2 is an image file that provides a Music Cling sheet that comprises "The Black Bears" © 2014 Carol Caldwell-Edmonds and Shannon Edmonds from the first set of teaching pieces in The Studio in the Woods Piano Series, and provides an example of a Music Cling sheet.

FIG. 2 is an image file that provides a Music Cling sheet that comprises "The Black Bears" © 2014 Carol Caldwell-Edmonds and Shannon Edmonds from the first set of teaching pieces in The Studio in the Woods Piano Series, and provides an example of a Music Cling sheet. The actual digital file size printed on the corresponding Music Cling sheet is 2063-pixels by 2548-pixels, which is 6.877-inches by 8.493-inches at 300-pixels per inch. The actual physical size of the Music Cling sheet shown in FIG. 2 is 7-inches tall and 8¼ inches wide. The white key outlines in the illustration of the piano keys in FIG. 2, measured from the inside edges of the black lines that comprise the perimeter of the white key, are 5⅞ inches long and ⅞ inches wide, to match the dimensions of white piano keys on a standard grand piano keyboard. The black keys in the illustration of the piano keys in FIG. 2, measured from the inside edge of the black lines that comprise the perimeter of the black key, are 3⅞ inches long and ⅜ inches wide, to match the dimensions of black piano keys on a standard grand piano keyboard. The lines that comprise the perimeters of each key are ¹⁄₁₆ inch thick. The horizontal distance between the black keys that are grouped together, whether in groups of two, for example from D-flat to E-flat, or in groups of three, for example from G-flat to A-flat, is ½ inch. The horizontal distance between the outer edges of the black lines that comprise the perimeters of black keys between the groups of two or three black keys, for example from B-flat to D-flat, is 1¼ inches. The dimensions specified provide illustrations of keys that match actual piano keys when Music Cling sheets are overlaid on actual piano keys to align with the actual keys and show students which keys to play.

A Music Cling sheet comprises a sheet of printable, clear, transparent static cling vinyl on which Berry Musical notes are printed. All Music Cling sheets provided by this present invention are 7-inches tall. The width of each sheet varies according to the length of the section of keyboard or staff illustrated, the section of keyboard or staff being determined by the musical phrase notated on the Music Cling sheet.

Figure 8:
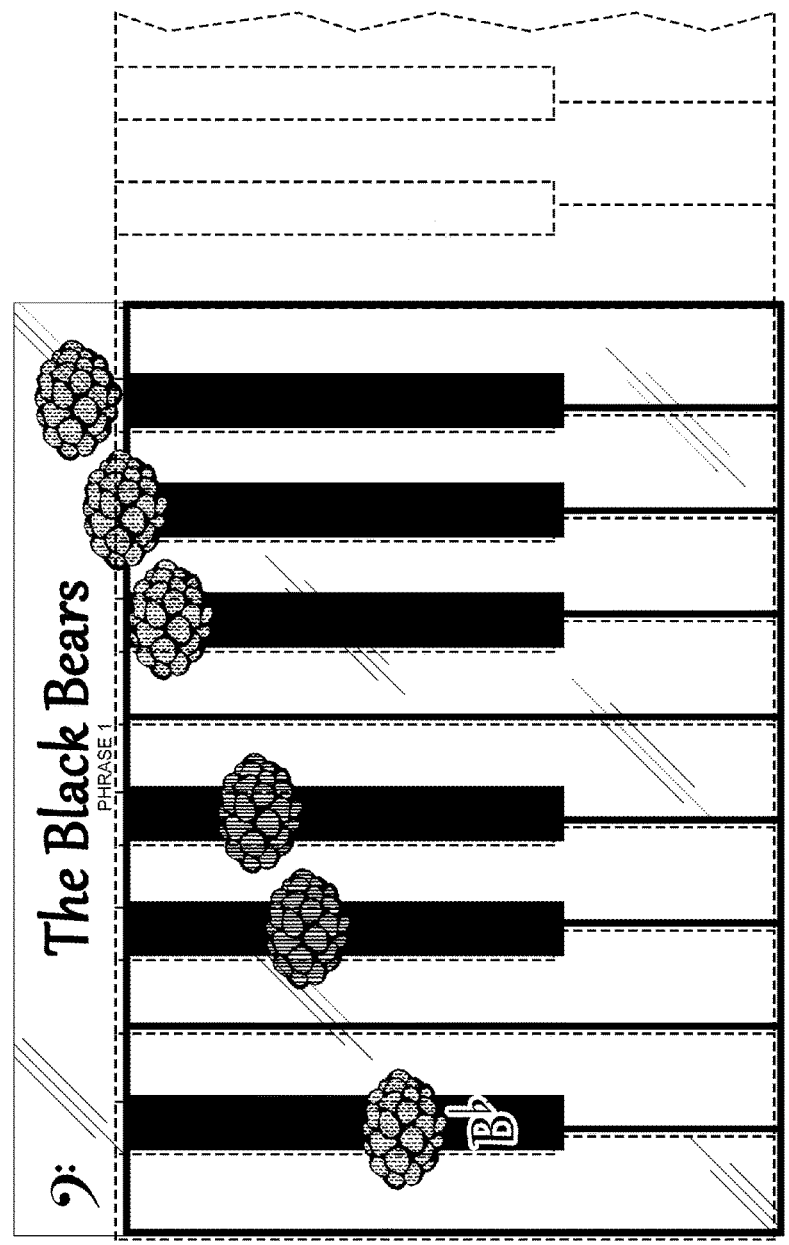

The positions of Berry Musical notes on Music Cling sheets, for example, the Music Cling sheet shown in FIG. 2, are determined by first centering the Berry Musical note's note head on the black key that the note head indicates to be played, and second, aligning the note head vertically on a Music Cling sheet such that the note head is correctly aligned with the position on a specifically sized staff, described below, and shown in FIG. 4, corresponding to the pitch indicated by the note head. There are no staff lines printed on Music Cling sheets that provide illustrations of piano keys and Berry Musical notes, but the positions of Berry Musical notes on the Music Cling sheets are determined as though there were such staff lines, so that when Music Cling sheets such as the one shown in FIG. 4 are flipped from the front side to the back side and overlaid onto Music Cling sheets with staff lines aligned perpendicular to the length of the natural keys such as the one shown in FIG. 3, the notes on both Music Cling sheets align, as shown in FIGS. 8 and 8b.

The teaching piece illustrated in FIG. 2 comprises six Berry Musical notes all using note head 1 as shown in FIG. 1, with stems and flags as shown to indicate that notes may be played with either the right or left hand, but with the indicated rhythmic durations. The B flat letter and flat symbol printed on the first black key in FIG. 2 labels the starting note of the piece for reference as the Music Cling sheet is relocated to different registers, and begins to teach association with letter names of black keys as starting pitch identifiers. The standard music repeat signs printed on the Music Cling sheet shown in FIG. 2, and the number 3.5 printed in the bottom right corner of the Music Cling sheet shown in FIG. 2, indicate that the musical phrase thus printed is to be repeated 3.5 times comprising the entire piece of music shown in FIG. 2.

FIG. 3 is an image file that provides a Music Cling sheet that comprises phrase one of "The Black Bears" © 2014 Carol Caldwell-Edmonds and Shannon Edmonds from the second set of teaching pieces in The Studio in the Woods Piano Series, and provides an example of a Music Cling sheet. The actual digital file size printed on the corresponding Music Cling sheet is 206-pixels by 2548-pixels, which is 6.877-inches by 8.493-inches at 300-pixels per inch. The actual physical size of the Music Cling sheet shown in FIG. 3 is the same as the actual physical size of the Music Cling sheet in FIG. 2. FIG. 3 thus illustrates a musical phrase from a teaching piece comprising a musical phrase that a student revisits. FIG. 3 is similar, but not exactly the same as FIG. 2, illustrating that material learned in the first set of teaching pieces, of which FIG. 2 provides an example, is revisited in the second set of teaching pieces, of which FIG. 3 provides an example. Dimensions for the illustrations of piano keys in FIG. 3 are the same as those described above for FIG. 2, and are the same hereinafter for all illustrations of piano keys on Music Cling sheets as described in this present invention. Placements of the Berry Musical notes in FIG. 3 are determined as described above for FIG. 2. Hereinafter, the positions of Berry Musical notes printed in all illustrations of piano keys on Music Cling sheets as described in this present invention in regards to the position of the note head on an illustration of a piano key, and the position of the note head to indicate pitch, are determined as described for FIG. 2, but the pitches are determined by a composer to indicate the musical phrase of any teaching piece composed as described below under "Composing Method," in this present invention.

FIG. 3 illustrates one phrase of an eight phrase piece. The eight phrases together comprise the entire teaching piece, "The Black Bears" © 2014 Carol Caldwell-Edmonds and Shannon Edmonds from the second set of teaching pieces in The Studio in the Woods Piano Series. FIG. 3 comprises a musical phrase, which comprises six note heads: Note head 3, FIG. 1, provides the first, fourth, fifth and sixth notes; note head 2, FIG. 1, provides the second and third notes. Piano keys indicated by 3 should be played with the left hand, and piano keys indicated by 2 should be played with the right hand. FIG. 3 does not use stem or flag illustrations, indicating that learning the hand positions and fingering to play the notes, and playing the correct pitches of the notes indicated, are the objectives.

Above the illustration of piano keys printed on the Music Cling sheet in FIG. 3, the text "The Black Bears PHRASE 1" is printed to assist the teacher and student to pair the illustrated Music Cling Sheet with the Music Cling sheet illustrated in FIG. 4. The aforementioned text is illustrative of the printing of titles and phrase numbers used on all Music Cling sheets that comprise the first phrase of a pair in the Studio in the Woods Piano series teaching pieces. The standard bass clef symbol printed in the upper left corner of FIG. 3 indicates, to a teacher, that Berry Musical notes on that particular Music Cling sheet are positioned according to the bass staff.

FIG. 4 is an image file that provides a Music Cling sheet that comprises phrase two of "The Black Bears" © 2014 Carol Caldwell-Edmonds and Shannon Edmonds from the second set of teaching pieces in The Studio in the Woods Piano Series, and provides an example of a Music Cling sheet. The cling sheet has a front side and a back side. The backside for laying against presentation surface 9 so that music can be read in standard format from left to right, the front side the opposite side of the cling sheet. The actual digital file size printed on the corresponding Music Cling sheet is 2063-pixels by 2278-pixels which are 6.877-inches by 7.593-inches at 300-pixels per inch. The actual physical size of the Music Cling sheet shown in FIG. 4 is 7-inches tall and 7⅛ inches wide.

The five horizontal lines illustrated in FIG. 4 provide a specifically sized music staff, which is an object of this present invention. The music staff comprises five lines, each ¹⁄₁₆ inch thick. The line at the top must align with the top perimeter line of the illustration of the piano keys, for example as shown in FIG. 3, so that the top line is ⅞ inch below the top edge of the Music Cling sheet upon which the top line is printed, measured to the top edge of the top line. The vertical distances comprising spaces between the five lines are each ¾ inch, measured from the bottom edge of the aforementioned ¹⁄₁₆ inch thick line above, to the top edge of the ¹⁄₁₆ inch thick line immediately below. Spacing exactly as described in the preceding statement allows the placement of Berry Musical notes in positions on the aforementioned specifically sized five lined staff printed on a Music Cling sheet such that when the Music Cling sheet is flipped from the front side to the back side and the staff lines are overlaid onto a second Music Cling sheet comprising Berry Musical notes printed on an outline of piano keys with the staff lines aligned perpendicular to the length of the keys, the outline of piano keys specifically sized as described and illustrated as in FIG. 2 and printed on the second Music Cling sheet, the positions of the Berry Musical notes printed on the aforementioned Music Cling sheet comprising a specifically sized five line music staff will match the positions of the Berry Musical notes printed on the aforementioned specifically sized outline of piano keys printed on the aforementioned second Music Cling Sheet (a.k.a. key cling sheet). Hereinafter, Berry Musical staff refers to a specifically sized five line music staff (a.k.a. staff cling sheet), an example of which is depicted in FIG. 4 and described above.

The arrow in FIG. 4 is an example of a symbol, which is not used in traditional musical notation systems. The symbol is used in the Studio in the Woods Piano Series to indicate the order of musical notes to be played, such as the descending musical phrase notated on Music Cling sheets that are printed with a Berry Musical staff, of which FIG. 4 is an example. The arrow provides a directional indicator to assist a student as the student follows the position of Berry Musical notes printed on a Music Cling sheet on a Berry Musical staff, during flipping of the aforementioned Music Cling sheet, followed by the translation of the aforementioned Music Cling sheet into a plane perpendicular to the actual piano keyboard, provided by the apparatus which is an object of this present invention, as described in detail below and illustrated by FIG. 8 through FIG. 8d. When on the presentation surface 9 the arrow runs from left to right for descending notes. When overlaid on piano keys or key cling sheets the arrow runs from right to left for descending notes.

The musical phrase illustrated in FIG. 4 comprises five note heads, the first, second and fifth comprising note head 3, FIG. 1, indicating that the piano keys to which the note heads correspond are to be played with the left hand; The third and fourth aforementioned note heads comprising note head 2, FIG. 1, indicate that the keys to which the note heads correspond are to be played with the right hand. FIG. 4 does not use stem or flag illustrations, indicating that learning the hand positions and fingering to play the notes, and playing the correct pitches of the notes indicated, are the objectives.

Below the Berry Musical staff printed on the Music Cling sheet in FIG. 4, the text "The Black Bears PHRASE 2" is printed to assist the teacher and student to pair the illustrated Music Cling Sheet with the Music Cling sheet illustrated in FIG. 3. The aforementioned text is illustrative of the printing of titles and phrase numbers used on all Music Cling sheets that comprise the second phrase of a pair in the Studio in the Woods Piano series teaching pieces.

FIG. 5 is a front elevational view of an example of a preferred embodiment of an apparatus (a.k.a. music stand), the apparatus is one object of this present invention, which can be placed upon the key blocks of an acoustic piano adjacent to the keys. The apparatus comprises presentation surface 9, a white 20% translucent acrylic panel 3/16 (0.177)" thick, 7" wide, 50" long. The acrylic panel is secured between two end pieces. The end pieces are made of pinewood is this example, each of which comprise a right-triangular shaped side support, 10, 3/4 inch thick, 7-inches tall, 3½ inches deep at the bottom edge, 3/4 inch deep at the top edge, affixed with wood glue to a right-triangular piece 11, which is made of pinewood in this example, 3/4 inch thick, 7-inches tall, 3/4 inch deep at the bottom edge and 1/16 inch deep at the top edge. Carol Caldwell-Edmonds and Shannon Edmonds are submitting the specific shapes of the two embodiments of an apparatus shown in FIG. 5 and FIG. 6 under separate application for a design patent concurrent with this provisional utility patent application.

The aforementioned Music Cling sheets adhere, are removed, are replaced, and adhere again to 9 as needed according to the teaching method, described below, the teaching method is one object of this present invention.

FIG. 5B is a cross sectional view of one end piece of the embodiment of the apparatus shown in FIG. 5, in which 10, 11, 12, and 13 are shown, viewed from a position to the left side of the apparatus. As shown in FIG. 5B, each end piece comprises 12 a zinc plated steel corner brace, sized 3 inches long, 3/4 inch wide, the specifications for the corner brace providing sufficient rigid support and weight to stabilize the apparatus. 12 is affixed to 10 with two screws up through the bottom edge of 10, such that the right angle turn of the corner brace is 1/4 inch from the back edge of the pinewood end piece, such that there is a gap between 10 and the upright leg of 12. 12 is covered in non-slip soft material, 13, for example vinyl fabric of 1/16 inch thickness, the vinyl fabric cover extending beyond the metal to cover the bottom edges of each end piece. An acrylic panel 9, is slid in between the vinyl covered upright leg of 12 and 10, one at each end of the acrylic panel, and each end piece is positioned on each key block of an acoustic piano, thus securing the acrylic panel in a position perpendicular to an acoustic piano keyboard.

FIG. 5A is a front elevational view of the example of an embodiment of the apparatus illustrated in FIG. 5, showing how the apparatus is situated on an acoustic piano's key blocks. FIG. 5A illustrates that the apparatus is positioned such that the acrylic panel is in close proximity to the actual piano keyboard, perpendicular to the piano keys, immediately in front of the fallboard of a piano. The purpose of the apparatus is to provide 9, a surface to which a Music Cling sheet, for example, "The Black Bears" © 2014 Carol Caldwell-Edmonds and Shannon Edmonds, Shown in FIG. 2, can cling such that a student may use the Berry Musical notation symbols to identify which keys, in this example, moving left to right, to play on a piano keyboard, and may then move the Music Cling sheet from 9 to actual piano keys, and back to 9, learning that the notes look similar because the piano keys they identify are the same. However, music notation symbols lie in a different plane than piano keys. This present invention provides concrete embodiment of the abstract concept of perpendicular planes, and the significance of the concept to reading music notation, as explained further below in the teaching method specification. Further, a Music Cling sheet may be moved from register to register on a piano, and cling to that section of 9 perpendicular to different registers, as instructed by a teacher, to play the full range of keys available, and learn the differences in pitch of keys in different piano registers.

FIG. 6 is a front elevational view of an example of a preferred embodiment of an apparatus (a.k.a. music stand), which is an object of this present invention, and can be placed upon the floor such that it will extend over the keyboard of an electronic keyboard or an electronic console piano and adjacent to the keys. The apparatus, shown in FIG. 6, provides a presentation surface 9 to which the aforementioned Music Cling sheets adhere, are removed, are replaced, and adhere again as needed according to the teaching method, described below, the teaching method comprising another object of this present invention. The presentation surface is supported substantially perpendicular to and above the keys. The apparatus, shown in FIG. 6, also provides a music rest, described below, onto which piano music books that are part of more advanced levels of the Studio in the Woods Piano Series may be placed.

The apparatus shown in FIG. 6 comprises two side supports, the vertical supports extending from a ground level to the presentation surface, each comprise: an end piece 14; an isosceles triangular shaped vertical support 15; a right-triangular shaped vertical support 16; and a circular disk base 17. The aforementioned side supports suspend a music rest between them, the music rest comprises: a horizontal support 18; three metal corner braces 19, the metal corner braces each covered by non-slip soft natural or synthetic material 13; and an acrylic panel 9.

The aforementioned end pieces 14, are made of pinewood, in this example, each 3/4 inch thick, 5 3/8 inches wide, and 6-inches tall on the outside edges, sloping along a straight line to 7-inches tall at the other edge of each pinewood end piece. The two aforementioned isosceles triangular shaped vertical supports 15 are made of pinewood, in this example, 3/4 inch thick, and 37-inches tall, 9-inches wide at the bottom, and ¾ inch wide at the top of the isosceles triangle shape. Two #6 by 1½ inch zinc wood screws are used to affix each end piece 14 to each vertical support 15 through 15 along a line centered on 15 at 2-inches and 4-inches down from the top edge of 15, the top edge of 15 flush with the shorter top edge of 14.

Each of two aforementioned right-triangular shaped vertical supports 16, are made of pinewood in this example, ¾ inch thick, and 3-feet tall, 2½ inches wide at the bottom, and 1/16 inch wide at the top of the right-triangle shape, as shown in FIG. 6, 16 is affixed centered and perpendicular to 15 with two #6 by 1½ inch zinc wood screws, through 15: the first wood screw affixed 1½ inches up from the bottom edge of 15, the second wood screw affixed 1-foot up from the bottom edge of 15. The thin top portion of 16 is affixed to 15 with wood glue and covers the screws that affix each 14 to each 15, providing a smooth wooden exterior surface.

Each of two of the aforementioned circular disk base pieces 17 are made of pinewood ¾ inch thick and 9-inches in diameter, in this example. 15 is affixed to 17 along a diameter line with three #6 by 1½ inch zinc wood screws as follows: one screw centered on 17, up through the bottom of 17 into 15; the other two screws positioned along the aforementioned diameter line, the diameter line centered beneath the bottom edge of 15, each aforementioned screw three inches from the center of 17, along the aforementioned diameter line. One #6 by 1½ inch zinc wood screw affixes the bottom edge of 16 to the base 17, up through the bottom of 17 into 16, 1½ inches from the center of 17, along a line centered beneath the bottom edge of 16.

The aforementioned horizontal support 18 is made of pinewood in this example, ¾ inch thick, 2¾ inches deep and 60 inches long. Each end piece 14 is affixed to 18 with two #8-32 zinc wing nuts and two #8-32×2 zinc hanger bolts, The hanger bolts are screwed up into the bottom edge of each end piece 14, one hanger bolt at 1½ inches, and the other at 4¼ inches, from the shorter edge of 14. Correspondingly placed holes in 18 allow the bolts to be used to affix 18 to each end piece 14 with the aforementioned wing nuts.

18 provides a support for 9, a white 20% translucent acrylic panel 3/16 (0.177)" thick, 7" wide, 50" long, such that 9 is positioned perpendicular to an electronic keyboard. The acrylic panel is slid into place between the tall edges of the end pieces 14, and three 2-inch by ⅝ inch zinc plated steel corner braces 19 all affixed to 18, one behind each tall end of each end piece 14, and one in the center of 18, as described and shown below in the rear elevational view, FIG. 6A.

FIG. 6A is a rear elevational view of FIG. 6 showing 9 held in place by three 2-inch by ⅝ inch zinc plated steel corner braces 19, covered by non-slip soft vinyl fabric and affixed to 18 by screws through the underside of 18, positioned as described above.

FIG. 6B is a left side elevational view of the apparatus shown in FIG. 6.

FIG. 6C is a cross sectional view of one of the aforementioned 2-inch by ⅝ inch zinc plated steel corner braces 19, covered by non-slip soft fabric, 13, for example, vinyl fabric of 1/16 inch thickness.

FIG. 6D is a front elevational view of the apparatus shown in FIG. 6 placed in position over an 88-key electronic keyboard.

FIG. 6E is a front elevational view of the apparatus shown in FIG. 6 placed in position over a 61-key electronic keyboard, such that the portion of the keyboard in the smaller electronic keyboard model is understood in context to an 88-key keyboard, as described in the teaching method section below. Thus the apparatus may be used over any sized electronic keyboard, for example, in a piano classroom that has several keyboard instruments for group lessons.

Figure 6F:
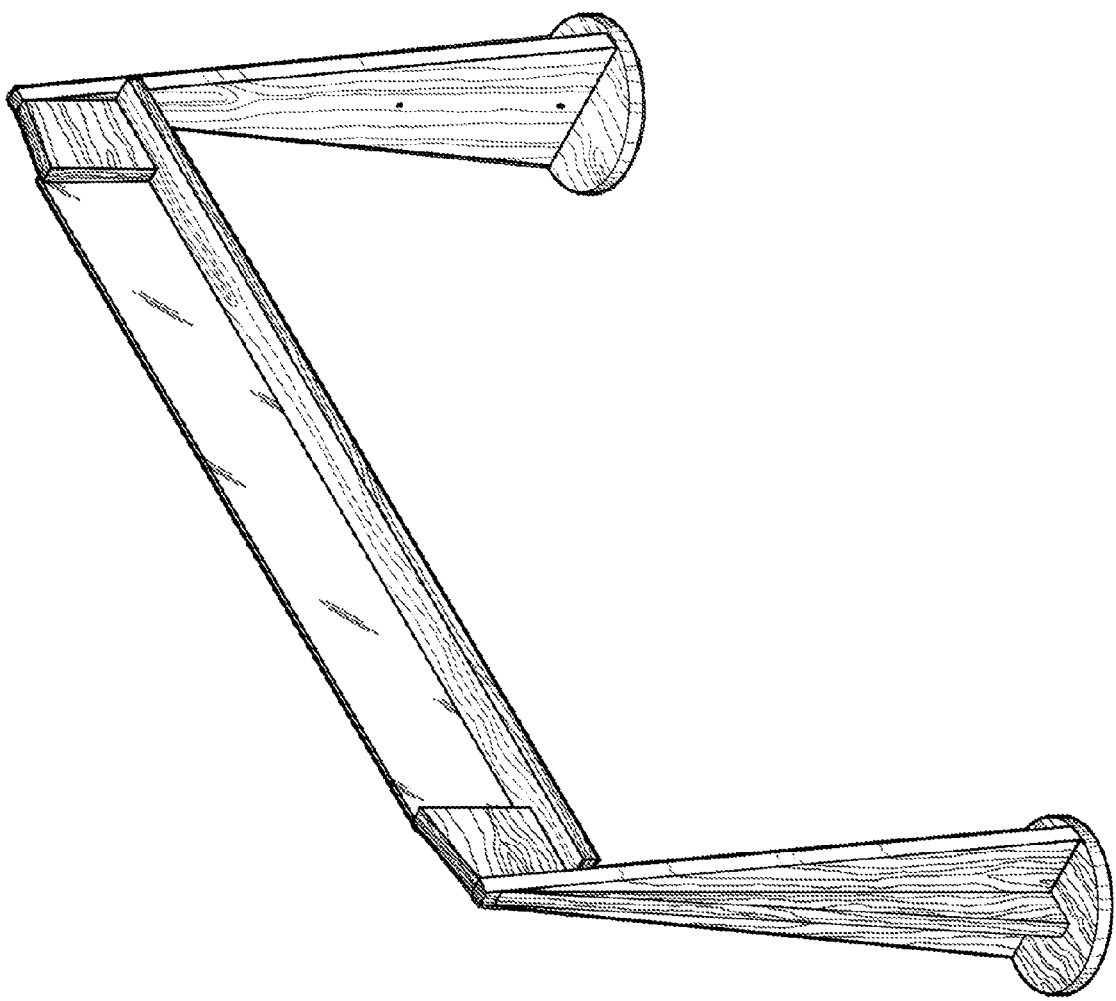
FIG. 6F is a left perspective side view of the apparatus shown in FIG. 6 showing right and left side supports.

FIG. 6F is a left perspective side view of FIG. 6 showing right and left side supports. The side supports are identical except that the right side support is a mirror image of the left.

The component pieces 10, 11, 14, 15, 16, 17, and 18 in the preferred embodiments described and shown in FIG. 5 and FIG. 6 are made of pinewood in this example, however, the components specified to be made of pinewood in this example may be made of hemlock, spruce, maple, or birch wood, all woods from trees in the environment of the Studio in the Woods, the trees all musically depicted in theme music in the Studio in the Woods Piano Series.

Composing Method

The principles and execution of a method for composing piano pieces that, according to the present invention, satisfy the requirements for positioning Berry Musical notes on Music Cling sheets follow, it being understood that the following drawings and descriptions are given for illustrative purposes only and are not meant to be limiting.

Piano music written to utilize this present invention, for example, the Studio in the Woods Piano Series' first and second sets of teaching pieces, printed on Music Cling sheets, must fulfill the following requirements: pieces in the first set comprise ascending musical phrases comprised of pitches corresponding to the black keys on a piano. Pieces are prepared for printing on Music Cling sheets using computer software that is capable of manipulating images on several layers with Berry Musical notes on one layer, superimposed on the outline of piano keys on another layer, resulting in an image, for example as shown in FIG. 2 and described above. Pieces are written to introduce the various registers on the piano by musically depicting various woodland animals, or environmental features comprising the background setting and characters featured in the Studio in the Woods Piano Series. For example, the piano teaching piece, "Spinning Spiders," from the first set in the Studio in the Woods Piano series, comprises a musical phrase in the highest register on the piano keyboard, musically depicting spiders spinning webs high up in the eaves of the Studio. Pieces are composed to involve the immediate physical environment to provide association with the musical environment, which is a piano.

Pieces in the second set of the Studio in the Woods Piano Series are composed under the following constraints: Each piece comprises pairs of musical phrases, such that the first musical phrase in a pair consists of ascending notes only, the phrase printed on a Music Cling sheet as described above for the first set, an example is shown in FIG. 3; pieces in the second set may comprise pitches corresponding to black keys or white keys on a piano. The second musical phrase in a pair consists of descending notes only; the second musical phrases comprise pitches corresponding to black keys or white keys on a piano. Further, the second musical phrases are prepared for printing on Music Cling sheets using computer software that is capable of manipulating images on several layers with Berry Musical notes on one layer, superimposed on a Berry Musical staff on another layer, resulting in an image, for example as shown in FIG. 4 and described above. Pieces in the second set are written to revisit phrases introduced in the first set as themes musically depicting various woodland animals, or environmental features comprising the background setting and characters featured in the Studio in the Woods Piano Series.

Placement of Music Cling sheets in different piano registers comprise complex pieces consisting of several pairs of phrases, for example, the layout of "The Black Bears" © 2014 Carol Caldwell-Edmonds and Shannon Edmonds, from the second set of the Studio in the Woods Piano Series, shown in FIG. 7.

All piano pieces written to utilize this present invention are composed to facilitate the use of the teaching method described below.

Teaching Method

The principles and execution of a method for teaching students to play piano using piano pieces composed using the composing method described above, according to the present invention, may be better understood with reference to the drawings and the accompanying description below, it being understood that these drawings are given for illustrative purposes only and are not meant to be limiting.

The objectives of the lessons based upon first set of teaching pieces in the Studio in the Woods Piano Series comprise the first stage of the teaching method that is an object of this present invention. The first educational objective of stage one is to make a direct and concrete connection between the location of a finger touch on a particular black key on a piano keyboard, and the placement of a particular note symbol, a Berry Musical note, to represent that touch location on a piano key. A student lays a Music Cling sheet, for example, FIG. 2, on actual piano keys and plays the indicated keys by pressing the Berry Musical note heads on the Music Cling sheet, simultaneously pressing the indicated piano keys and playing the intended pitches. Then a student slides the Music Cling sheet up onto an apparatus, for example, the embodiment shown in FIG. 5, making a concrete, touch-based connection between the keys just pressed, and the symbols on a PICTURE of the same piano keyboard section. This activity introduces another educational objective of stage one, learning to associate notation symbols on an illustration of a portion of a piano keyboard to the corresponding piano keys.

Repeating this process in different registers, and with different Music Cling sheets containing different musical phrases, a student learns that the notes look similar, whether laid on piano keys or set to cling to the apparatus, because the piano keys the Berry Musical notes identify are the same. However, when notes that appear similar are played in different piano registers, the pitches are higher or lower by an octave or multiple octaves, depending upon the register in which a student is directed to play. Thus, yet another educational objective of stage one of this teaching method is introduced: playing the full range of keys available, to learn the differences in pitch of keys in different piano registers.

The embodiment of the apparatus that stands on the floor, FIG. 6, can be positioned over electronic keyboards that do not have 88 keys, as shown in FIG. 6E. The aforementioned apparatus is positioned such that a keyboard with fewer than 88 keys aligns with the keys a student will play which are printed on Music Cling sheets when the Music Cling sheets are placed on the apparatus in the correct registers, as determined by the musical phrase printed on the Music Cling sheets. The aforementioned embodiment that stands on the floor therefore is also used as a tool which teaches a student which subset of piano keys and registers a student has available on a keyboard with fewer than 88 keys, compared to a full 88 key piano keyboard.

Berry Musical notation symbols printed on a Music Cling sheet, when placed on an apparatus that is an object of this present invention, lie in a different plane than piano keys. This present invention provides concrete embodiment of the abstract concept of perpendicular planes. Practicing the demonstration of the role of these perpendicular planes in reading music notation symbols is another educational objective of stage one. The apparatuses shown in FIG. 5 and FIG. 6, juxtapose the plane in which piano keys lie, and the plane in which musical symbols are placed, in close proximity. A student is able to manipulate music cling sheets repeatedly. This activity comprises practice. The practice utilizes kinesthetic memory, the use of which is an important skill in piano playing, but one underemphasized in music reading.

Another educational objective of stage one is to introduce the concept of musical rhythm. Stage one of the teaching method herein described, utilizes Berry Musical note symbols using stems and flags as in traditional music, to introduce the concept of notating rhythm. The Studio in the Woods Piano Series facilitates the introduction of rhythmic values of notes using stems and flags as shown in FIG. 1 and discussed above.

Rhythm is traditionally taught, in other piano lesson series, with activities which are physical, repetitive, and which therefore build kinesthetic memory, such as clapping a rhythmic phrase, singing lyrics to a tune, etc. The approach to teaching rhythm is not claimed as an object of this present invention. However, the new feature of the present invention comprises music symbols denoting rhythmic values that are also part of Berry Musical notation, examples of which are shown in 4, 5, 6, 7, and 8, in FIG. 1. The music symbols are objects of this present invention.

Yet another educational objective of stage one is to introduce piano technique by teaching hand positioning. Teaching pieces in the Studio in the Woods Piano Series that use note heads 2 and 3, FIG. 1 begin to introduce hand positions. To play more challenging musical phrases, a student must determine which finger on which hand to use to press a particular piano key, and how to hold one's hand to facilitate effective playing technique. More advanced pieces at the end of the first set of teaching pieces, and the pieces of the second set of teaching pieces, for example, FIG. 3 and FIG. 4, introduce fingering and hand positions by using the aforementioned note heads.

The educational objectives of stage two of the teaching method, which is an object of this present invention, relate to teaching students to comprehend the concept of a music staff, a fundamental component of music notation. In the inventors' experience, it is often at this point, at which students are introduced to reading music notation on a staff, that students who can easily manipulate printed symbols in their minds often seem to be "talented," and those who cannot quit piano lessons. Stage two of the teaching method that is an object of this present invention is designed to address this shortcoming in traditional piano teaching methods.

FIG. 8, and FIGS. 8A through 8D comprise a series of drawings which illustrate how Music Cling sheets comprising the second of each pair of musical phrases in the second set of the Studio in the Woods piano series are used to teach the concept of the five line music staff. FIG. 3 and FIG. 4 comprise a pair of Music Cling sheets that are Phrase 1 and Phrase 2, respectively of "The Black Bears" © 2014 Carol Caldwell-Edmonds and Shannon Edmonds, a piece in set two of the Studio in the Woods Piano Series, as described above. Teaching the concept of a five line staff as follows comprises an object of this present invention. The following steps comprise an example of how the present invention provides a means to teach the concept:

Step one: A student first lays a Music Cling sheet, for example, FIG. 3, on a piano keyboard so that the illustrations of piano keys on the Music Cling sheet align with the actual piano keys, in a piano register indicated by a teacher, resulting in a layout as shown in FIG. 8, which shows the lowest piano register on an 88 key piano keyboard.

Step two: A student then slides the Music Cling sheet up onto the apparatus, resulting in the layout shown in FIG. 8A, the layout positioned on an apparatus on a piano in front of the fallboard. Step two thus teaches a student to make a concrete touch-based connection between the keys just pressed, and the symbols on a picture of the same piano keyboard section, the picture being in the abstract plane, in which written music is viewed, perpendicular to the piano keyboard.

Step three: FIG. 8B, illustrated from a viewpoint looking down from above at a piano keyboard, illustrates the next step in which a student lays a Music Cling sheet, for example, FIG. 4, face down, so that the printed side of the Music Cling sheet touches the keys, on the piano keys. The Music Cling sheet shown in FIG. 4 provides Berry Musical notes printed on a Berry Musical staff, the notes align with the same register of piano keys played in step one above, but a different sequence of Berry Musical notes is indicated. A directional arrow on the Music Cling sheet points from right to left, when placed as described. A comparison of FIG. 8, to FIG. 8B shows that these are the same keys, in the same register, indicated by FIG. 3. However, because Music Cling sheets comprising the second in each pair of musical phrases such as FIG. 4, for example, identify which keys to play moving right to left, as indicated by the arrow printed on the Music Cling sheets, Music Cling sheets, such as FIG. 4, must first be be flipped relative to the plane that the piano keys occupy before being translated into place in a different plane, provided by the apparatus.

Step four: A student manipulates the Music Cling sheet as described in step three, the aforementioned rotation, shown in FIG. 8C.

Figure 8C:
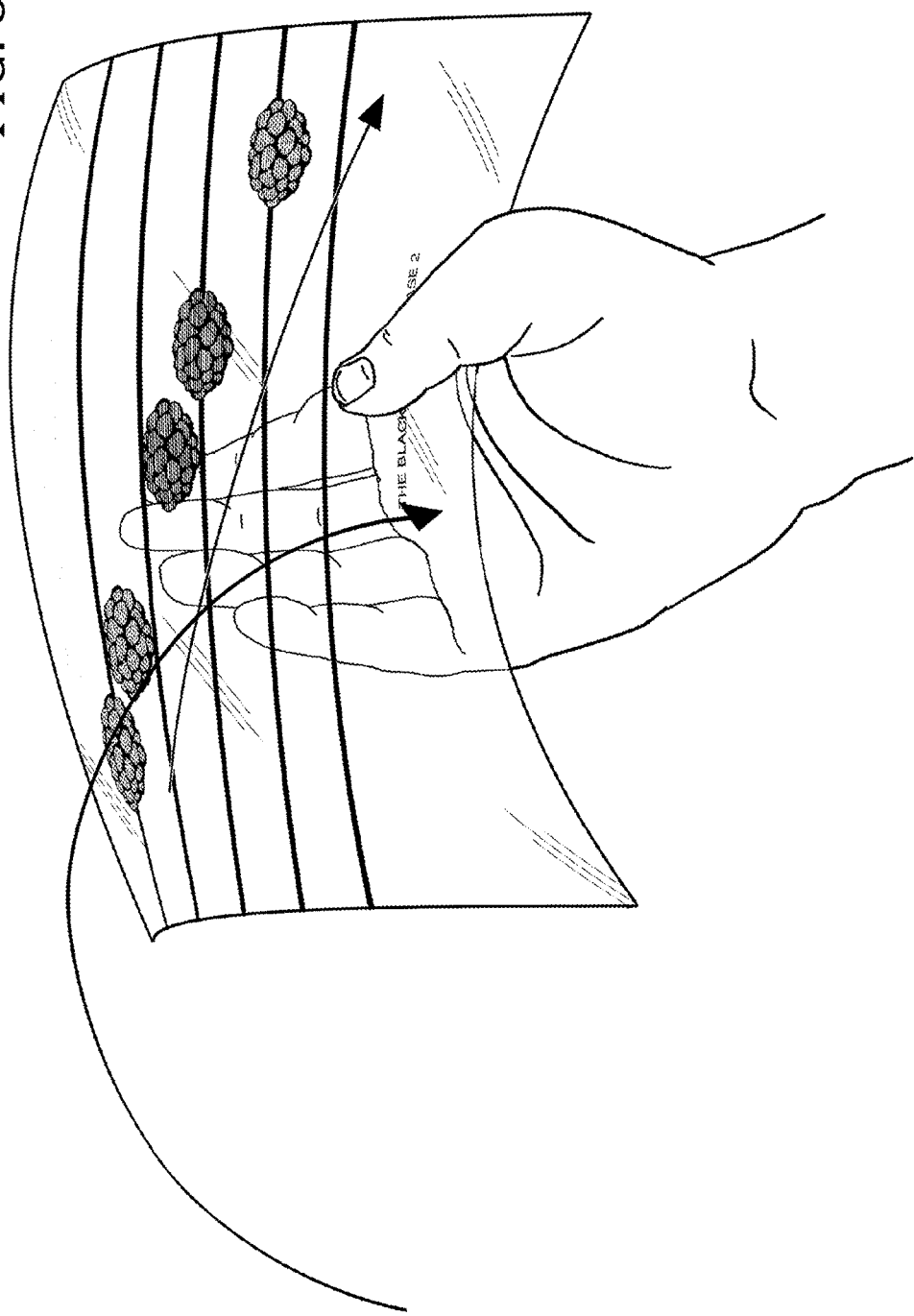

Step five: The result of the aforementioned sliding into place, after the rotation shown in FIG. 8C, is shown in FIG. 8D. FIG. 8D thus illustrates the arrangement of Phrase 1 and 2 of "The Black Bears" © 2014 Carol Caldwell-Edmonds and Shannon Edmonds, on the apparatus after both Music Cling sheets have been correctly placed on the apparatus.

Step six: A student then plays both musical phrases, in order, reading left to right, as a teacher notes that piano keys in the second musical phrase of a pair are read left to right, but played right to left.

Repeatedly manipulating Music Cling sheets as described above, in steps one through six, on a piano keyboard, and on an apparatus as described, provides a concrete embodiment of the abstract concept of a music staff, and helps a student make a corresponding mental connection between Berry Musical note symbols and the piano keys the note symbols represent. Using this present invention, students learn to read music notation symbols without the need to memorize letter name associations, accidentals, or key signatures. Instead, a student practices physical manipulation of Music Cling sheets to build kinesthetic memory associations. Teachers are able to teach techniques that help students affect the sounds a piano makes as Music Cling sheets are moved from register to register, for example, bass registers may be chosen to sound like a "papa bear" black bear; the highest register could sound like a "baby bear," encouraging creative interpretations of the characters and their musical themes.

The piano keyboard comprises the plane in which keys are played; the apparatus comprises the plane in which music notation exists. The manipulation of Music Cling sheets described in the preceding paragraph also teaches that Music Cling sheets illustrating piano keys played from left to right cannot be placed on the apparatus in the same way as the Music Cling sheets illustrating the Berry Musical Staff which indicate notes to be played from right to left. A student sliding a Music Cling sheet into place on the apparatus correctly learns to make mental connections about how ascending and descending notes correspond to playing piano keys from left to right and right to left, respectively, and the connections do not require memorization or an understanding of musical notation letter names or accidentals. Connections are made through practice and promote kinesthetic learning.

The second set of piano teaching pieces in the Studio in the Woods Piano Series includes pieces in which Berry Musical notes are combined with standard music notation to provide a transition from the illustrated notation symbols, for example, symbols shown in FIG. 1, to standard traditional representations of musical notes and rests. Standard music notation symbols are printed on Music Cling sheets in sizes specified for Berry Musical notes when first introduced, but the standard music notation symbols are reduced in printed size when printed in book format, the books follow the sets of pieces printed on Music Cling sheets, gradually introducing students to the grand staff and printed standard music notation.

Another educational objective of both stage one and stage two of the teaching method that is an object of this present invention is to provide opportunities and tools to promote spiral learning: students revisit phrases learned in first set of piano teaching pieces in the Studio in the Woods Piano Series, as the ascending first phrases of pieces in the second set. The teaching method herein described employs active learning, and follows a student's natural learning style as exhibited in the behavior of singing: pitches and melody are sung long before representations of note heads and symbols of musical notation are learned. This teaching method and the Music Cling sheets described herein provide tools to teach students musical notation through active practice. Students play the piano, and play all of the keys available, before they learn to read printed music notation and the letter names of notes. Practiced manual manipulation builds associations to enable transference of concepts practiced using Music Cling sheets to the abstract concept of the music grand staff, which is essential to learning traditional music notation.

A final educational objective of this teaching method is to teach the Studio in the Woods Piano Series pieces with recorded accompaniments, the accompaniments are included with the Studio in the Woods Piano Series, to develop the skills of listening to other music while playing the piano, and synchronizing one's own playing with the other music. To be focused on reading notes is not music making; learning to make an instrument sound certain ways-like a big bear, or a graceful moth, or a busy spider, is learning music. The Studio in the Woods Piano Series provides teachers with piano teaching pieces and recorded accompaniments which together promote awareness of one's environment: the sounds and themes inspired by the natural environment, as well as awareness of one's whole instrument, a piano. Students learn to play piano as part of a larger experience, and learn to listen and notice elements of the environments around them, musically reimagining the elements.

What is claimed is:

1. A kit for teaching how to play notes on the keys of a piano, the keys including natural and black keys, each natural key having a length and width; comprising:
   a staff cling sheet having a front side and a back side, said staff cling sheet having staff lines for displaying standard music notation, said staff lines having a space between any two staff lines that is substantially equal to the width of one natural key, said cling sheet having note heads aligned with said staff lines indicating keys to be played, said staff cling sheet having an arrow indicating an order for playing the keys, whereby when said staff cling sheet is flipped from said from side to said back side and said staff lines are positioned over and aligned perpendicular to the length of the natural keys, said note heads lay over and indicate Which corresponding keys should be played for descending notes.

2. A device as recited in claim 1, wherein for descending notes said arrow runs left to right when viewed from said front side and right to left when viewed from said back side.

3. A device as recited in claim 1, further comprising a music stand for placement adjacent the keys.

4. A device as recited in claim 2, wherein said music stand has a presentation surface to align said staff cling sheets adjacent said keys.

5. A device as recited in claim 4, where said presentation surface is a static cling surface.

6. A device as recited in claim 4, wherein said presentation surface is substantially colored to match the natural keys of the piano.

7. A device as recited in claim 4, wherein said presentation surface is supported substantially perpendicular above the keys.

8. A device as recited in claim 4, wherein said presentation surface is substantially the width of all keys.

9. A device as recited in claim 4, wherein said presentation surface is support by vertical supports extending from a around level to said presentation surface.

10. A device as recited in claim 4, wherein said presentation surface is supported by side supports, each side support extending from a level of the keys to said presentation surface.

11. A device as recited in claim 1, wherein said staff cling sheet is a transparent sheet.

12. A device as recited in claim 11, wherein said staff lines, note heads and arrow are substantially opaque.

13. A device as recited in claim 1, wherein said staff lines, said note heads and said arrow are substantially the color of said black keys.

14. A device as recited in claim 1, further comprising one or more key cling sheets having images of keys substantially the same size as the keys.

15. A device its recited in claim 14, wherein ail ascending note heads are on said key cling sheets.

16. A device as recited in claim 14, wherein all descending note heads are on said staff cling sheets.

* * * * *